United States Patent
Kamba et al.

(10) Patent No.: US 9,459,706 B2
(45) Date of Patent: Oct. 4, 2016

(54) INFORMATION DISPLAY SYSTEM, INFORMATION DISPLAY METHOD, AND RECORDING MEDIUM

(75) Inventors: Tomonari Kamba, Tokyo (JP); Kyoji Hirata, Tokyo (JP)

(73) Assignee: BIGLOBE, INC., Tokyo (JP)

( * ) Notice: Subject to any disclaimer, the term of this patent is extended or adjusted under 35 U.S.C. 154(b) by 226 days.

(21) Appl. No.: 14/241,812

(22) PCT Filed: Sep. 5, 2012

(86) PCT No.: PCT/JP2012/072653
§ 371 (c)(1),
(2), (4) Date: Feb. 27, 2014

(87) PCT Pub. No.: WO2013/035758
PCT Pub. Date: Mar. 14, 2013

(65) Prior Publication Data
US 2014/0292653 A1    Oct. 2, 2014

(30) Foreign Application Priority Data
Sep. 6, 2011    (JP) .................................. 2011-193953

(51) Int. Cl.
*G06F 3/0346* (2013.01)
*G06F 3/01* (2006.01)
(Continued)

(52) U.S. Cl.
CPC ........... *G06F 3/0346* (2013.01); *G02B 27/017* (2013.01); *G06F 3/011* (2013.01);
(Continued)

(58) Field of Classification Search
CPC ..... G06T 19/006; G02B 27/01; G06F 3/005; G06F 3/0488; G06F 3/0304; G06F 3/011; G06F 3/0346; H04N 13/00; G02N 27/017
See application file for complete search history.

(56) References Cited

U.S. PATENT DOCUMENTS 7,952,594 B2 * 5/2011 Morita .................... G06F 3/014
345/420
8,094,091 B2 * 1/2012 Noma ................... G02B 27/017
345/427
(Continued)

FOREIGN PATENT DOCUMENTS

EP    1622081    2/2006
JP    2718387    2/1998
(Continued)

OTHER PUBLICATIONS

Japanese Office Action issued by the Japanese Patent Office for Application No. 2011-193953 mailed on Sep. 2, 2014 with partial translation (4 total pages).
(Continued)

*Primary Examiner* — Abbas Abdulselam
(74) *Attorney, Agent, or Firm* — Wilmer Cutler Pickering Hale and Dorr LLP

(57) ABSTRACT

In an AR device, when display control of additional information is performed for an object, a display device acquires a picture including an object in real space. An pointing device outputs, when pointing the object in real space by an operation of a user, information showing a feature for identifying the pointed object. A control device analyzes the picture by the display device and identifies objects in the picture. The control device outputs position information in the picture for the identified object. The control device outputs position information in the picture for the pointed object based on the outputted information from the pointing device. The control device extracts additional information of a target object from an additional information group of objects in real space. The control device performs display control of the additional information based on the calculated position information. The display device displays the additional information.

12 Claims, 21 Drawing Sheets

(51) Int. Cl.
*G02B 27/01* (2006.01)
*G06T 19/00* (2011.01)
*G06F 3/0488* (2013.01)
*G06F 3/03* (2006.01)
*G06F 3/0354* (2013.01)

(52) U.S. Cl.
CPC .......... *G06F 3/0304* (2013.01); *G06F 3/0488* (2013.01); *G06T 19/006* (2013.01); *G02B 2027/014* (2013.01); *G02B 2027/0187* (2013.01); *G06F 3/03545* (2013.01)

(56) References Cited

U.S. PATENT DOCUMENTS

| | | | |
|---|---|---|---|
| 8,872,766 B2* | 10/2014 | Moore ................... | G02B 27/01 345/157 |
| 2005/0024388 A1 | 2/2005 | Takemoto | |
| 2006/0195858 A1 | 8/2006 | Takahashi et al. | |
| 2008/0030461 A1 | 2/2008 | Matsui et al. | |
| 2012/0154557 A1* | 6/2012 | Perez ............... | H04N 21/25891 348/53 |

FOREIGN PATENT DOCUMENTS

| | | |
|---|---|---|
| JP | 11-142782 A | 5/1999 |
| JP | 11-142784 | 5/1999 |
| JP | 2000-102036 | 4/2000 |
| JP | 2005-049996 | 2/2005 |
| JP | 2006-018444 | 1/2006 |
| JP | 2007-293413 A | 11/2007 |
| JP | 2008-040556 | 2/2008 |
| JP | 4488233 | 6/2010 |
| JP | 2010-231459 | 10/2010 |
| WO | WO-2004/095374 | 11/2004 |

OTHER PUBLICATIONS

International Preliminary Report on Patentability issued by the International Bureau of WIPO for International Application No. PCT/JP2012/072653, mailed Mar. 12, 2014 (6 pgs.).
Japanese Office Action with partial English translation corresponding to Japanese Patent Application No. 2011-193953, dated Feb. 24, 2015, 3 pages.
International Search Report corresponding to PCT/JP2012/072653, Oct. 17, 2012, 5 pages.

* cited by examiner

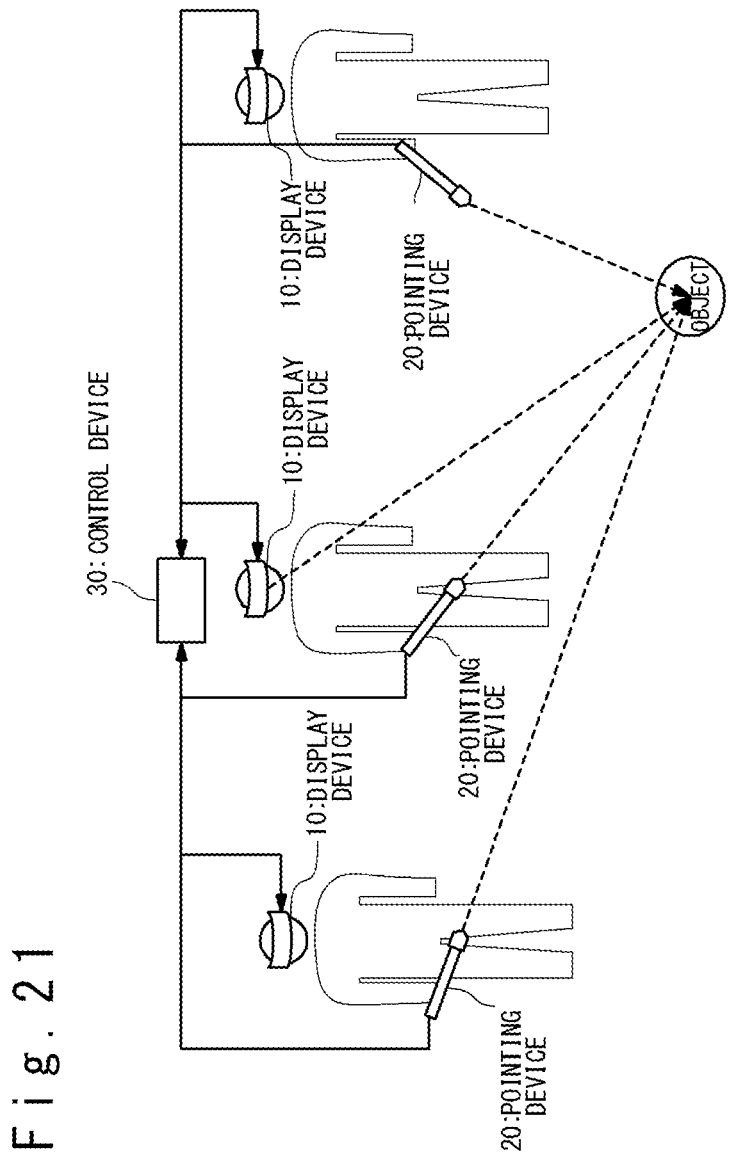

INFORMATION DISPLAY SYSTEM, INFORMATION DISPLAY METHOD, AND RECORDING MEDIUM

CROSS-REFERENCE TO RELATED APPLICATIONS

This application is a national stage application of International Application No. PCT/JP2012/072653 entitled "Informational Display System, Information Display Method, and Recording Medium," filed on Sep. 5, 2012, which claims the benefir of the priority of Japanese patent application No. 2011-193953, filed on Sep. 6, 2011, the disclosures of each of which are hereby incorporated in the entirety.

TECHNICAL FIELD

The present invention relates to an information display system, and in particular, relates to an information display system using AR technology.

BACKGROUND ART

AR (Augmented Reality) is known as a technique to provide supplementary information by superimposing information which is created by a computer (a computing machine) on information which is given from real environment to perception.

An AR device performs superimposing and displaying of a character, an image, a picture and so on which are related to an object that a wearer is looking at, on a transmissive display which is worn in front of eyes. This makes it possible to make an invisible portion visible and provide relevant information.

Patent Literature 1 (International Publication WO 2004/095374) discloses a picture object recognition device and a recognition method, a picture annotation giving device and a giving method, and a program. In Patent Literature 1, a system is proposed as a picture annotation giving device, the system recognizing an object in not a picture preliminarily prepared but a picture taken by using a camera by checking with a preliminarily-prepared dictionary in which visual information and position information of objects are recorded, and superimposing and displaying accompanying information preliminarily connected to the object.

As a related technique, Patent Literature 2 (Japanese Patent JP2718387B) discloses a moving object switch device. In Patent Literature 2, a system is proposed as a moving picture hypermedia system, the system preliminarily extracting an object to be displayed in a picture, and connecting the object to preliminarily-created additional information of the object, and then displaying additional information of the object in a picture when the object is designated with a pointing device such as a mouse.

In addition, Patent Literature 3 (Japanese Patent Publication JP-A-Heisei 11-142784) discloses a head-mounted display with a position detecting function. In Patent Literature 3, a see-through head-mounted display having a semi-transmissive screen is proposed as a display for presenting additional information, and a system is proposed, the system providing additional information of an object observed through the screen on the semi-transmissive screen by being provided with a position detecting function to the head-mounted display.

[A Picture Annotation Giving Device]

An example of a configuration of a picture annotation giving device will be described with reference to FIG. 1.

The conventional picture annotation giving device as shown in Patent Literature 1 has an input device, a storage device, an object recognizing device, a display position determining device, and a displaying device. The input device inputs a picture and shooting information. The storage device stores addition information on an object, geographical position information, and a visual feature amount, as object information. The object recognizing device recognizes an object in a picture by using a picture and shooting information from the input device and geographical position information and a visual feature amount from the storage device. The display position determining device determines a display position of addition information. The display device displays the addition information, as a result of the processing by each of the devices.

[A Moving Object Switch Device]

An example of a configuration of a moving object switch device for displaying additional information will be described with reference to FIG. 2.

The conventional moving object switch device as shown in Patent Literature 2 includes a pointing section, a moving picture frame detecting section, a distance measuring section, a distance scale changing section, a moving object region information storing section, and a moving object switch recognizing section. The pointing section inputs a pointing input from a pointing device such as a mouse. The moving picture frame detecting section detects each single image (frame) constituting a moving picture such as a picture. The distance measuring section measures/estimates an actual distance between the moving object switch device and an actual body of an object displayed in a picture. The distance scale changing section changes a scale of the distance. The moving object region information storing section stores preliminarily-created additional information of the object and a display position of the additional information. The moving object switch recognizing section recognizes an object in a picture and displays additional information.

By combining Patent Literature 1 and Patent Literature 2, information presentation in accordance with a pointing input through a touch panel can be achieved as shown in FIG. 3.

[A Head-mounted Display]

A configuration of a see-through head-mounted display having a semi-transmissive screen will be shown with reference to FIG. 4.

The conventional see-through head-mounted display as shown in Patent Literature 3 includes a CCD (Charge Coupled Devices) camera, an infrared picture processing section, a picture creating section, a projecting section, and a semi-transmissive screen. The CCD camera acquires an infrared image by shooting pictures. The infrared picture processing section performs processing for the infrared image acquired by the CCD camera through picture analysis. The picture creating section generates a on which additional information is displayed based on the infrared image to which picture analysis has been performed. The projecting section achieves, by projecting the video and the additional information on the semi-transmissive screen, provision of the additional information of an object observed through the screen.

When an AR device is a touch panel type detached from a face, pointing inputs such as displaying/deleting of additional information can be performed through a manual operation in real time by a user. However, when an AR device is a head-mounted display type worn on a user's face, pointing such as displaying/deleting of additional information cannot be performed through a manual operation in real time by a user.

CITATION LIST

Patent Literature

[PTL 1] International Publication WO 2004/095374 (Japanese Patent JP4488233B)
[PTL 2] Japanese Patent JP2718387B
[PTL 3] Japanese Patent Publication JP-A-Heisei 11-142784

SUMMARY OF INVENTION

An object of the present invention is to provide an information display system that, in an AR device, when display control of additional information is performed for an object, intuitively selects an object for which the display control of the additional information is performed, by using a portable pointing device.

An information display system according to the present invention includes: at least one display device; at least one pointing device; and a control device configured to communicate with the at least one display device and the at least one pointing device. The control device identifies an object which can be seen through the at least one display device based on information not from the at least one display device but from the at least one pointing device which points the object in a real space, and performs display control of additional information with respect to the object to on the at least one display device.

In an information displaying method according to the present invention, at least one display device, at least one pointing device and a control device configured to communicate with the at least one display device and the at least one pointing device are arranged. In addition, the control device identifies an object which can be seen through the at least one display device based on information from the at least one pointing device which points the object in a real space, and performs display control of additional information with respect to the object to on the at least one display device.

An information display program according to the present invention is a program for executing a process of an information display method mentioned above on a computing machine as a control device. Here, the information display program according to the present invention can be stored in a storage device and a recording medium.

Consequently, a user can easily perform display control of additional information of an object displayed in a screen by an extremely intuitive operation in which the user points an interesting object without directly touching the screen.

BRIEF DESCRIPTION OF DRAWINGS

FIG. 21 is a view explaining a fifth embodiment of the present invention.

DESCRIPTION OF EXEMPLARY EMBODIMENTS

<First Embodiment>

Figure 1:
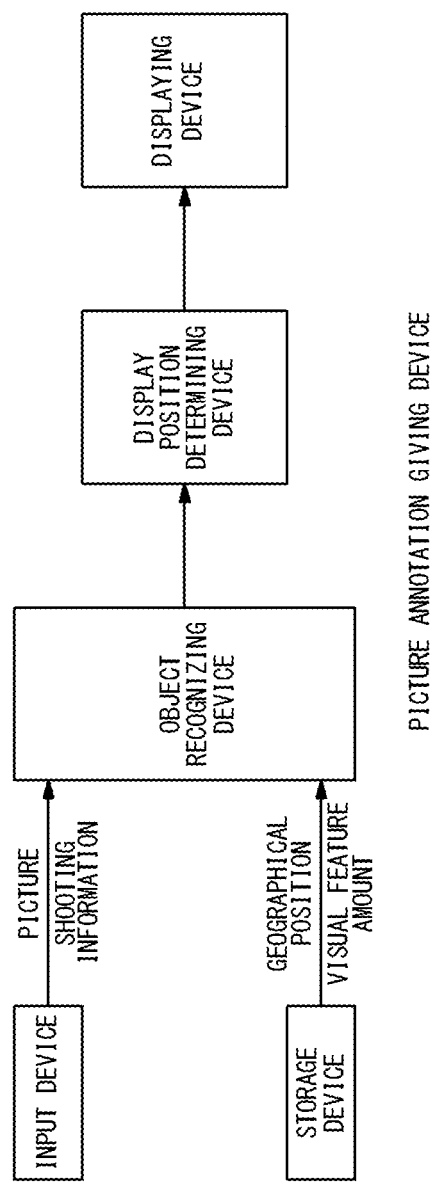
FIG. 1 is a view showing a configuration example of a picture annotation giving device.
Figure 2:
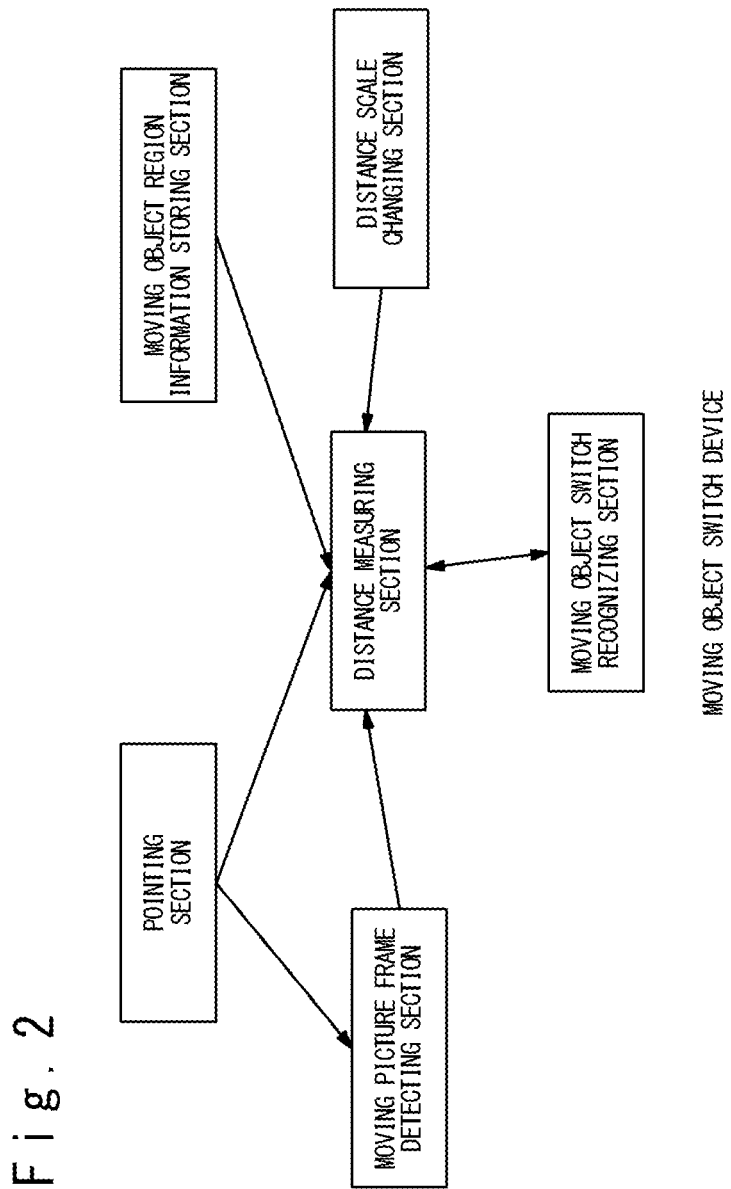
FIG. 2 is a view showing a configuration example of a moving object switch device.
Figure 3:
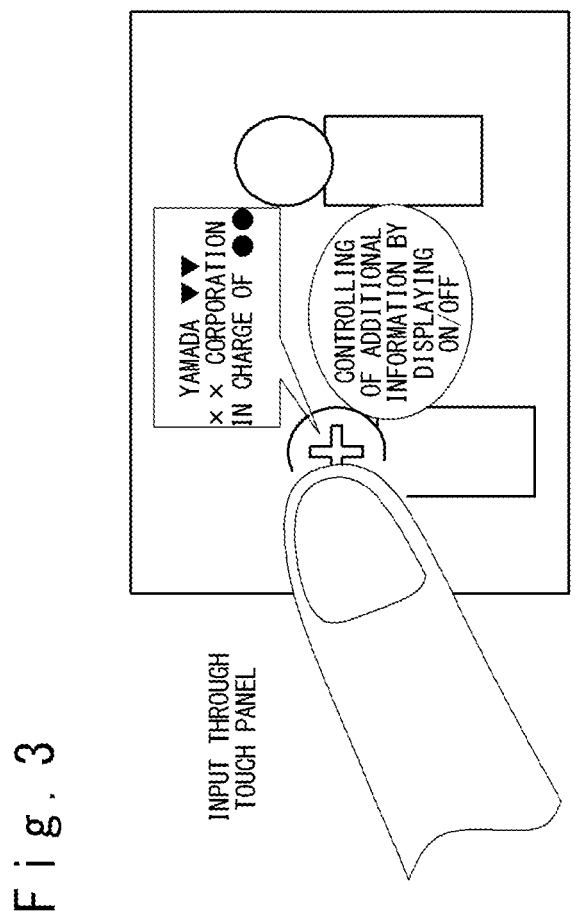
FIG. 3 is a view explaining a pointing input through a touch panel.
Figure 4:
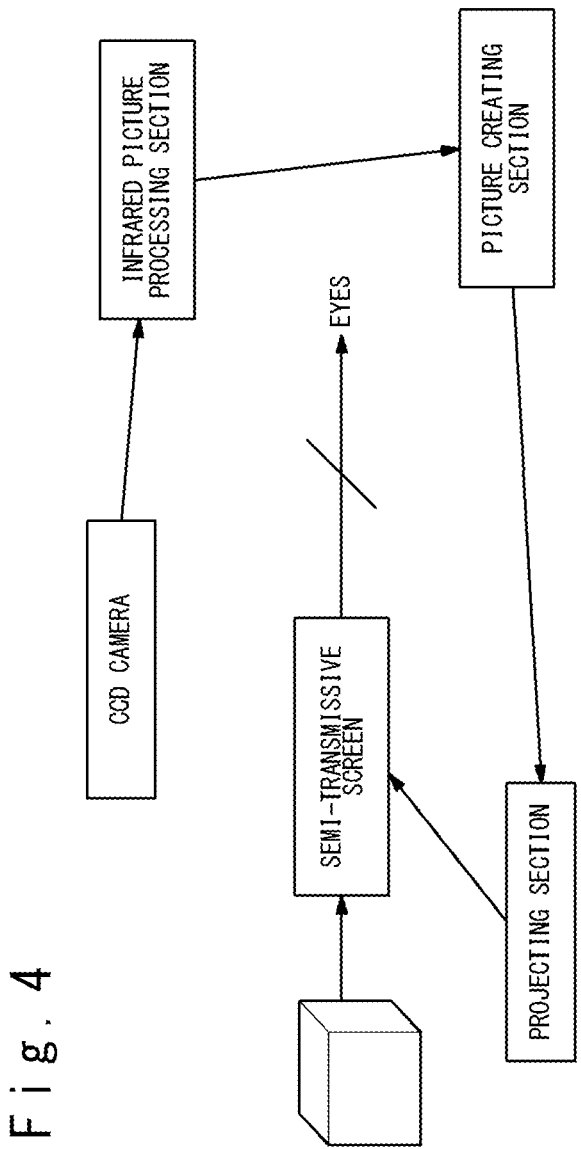
FIG. 4 is a view showing a configuration example of a head-mounted display.
Figure 5:
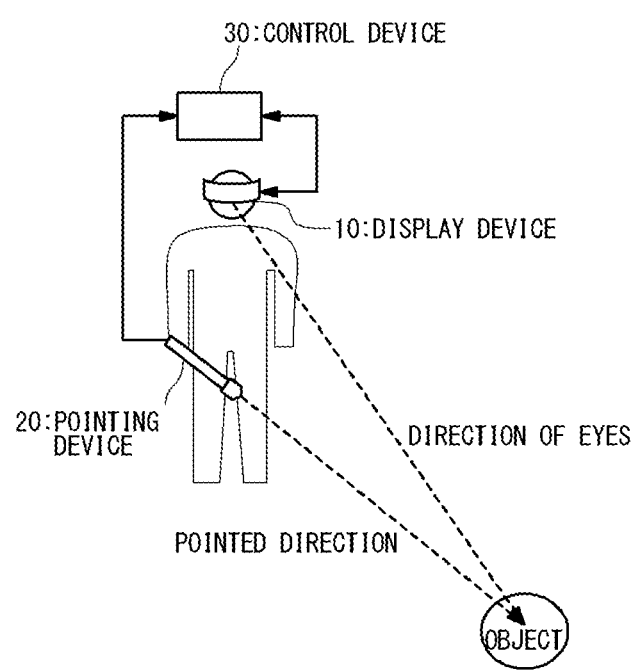
FIG. 5 is a view showing a basic configuration of an information display system according to a first embodiment of the present invention.
Figure 6:
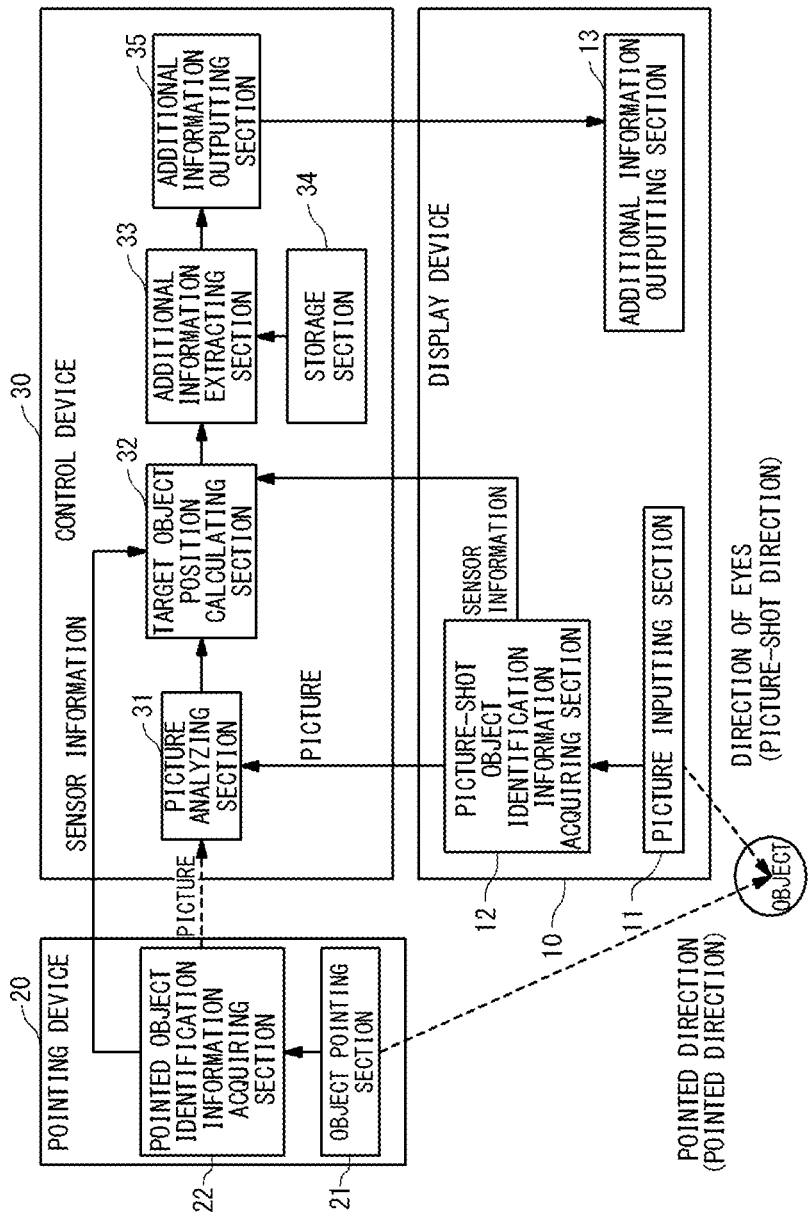
FIG. 6 is a view showing details of the information display system according to the first embodiment of the present invention.

The first embodiment of the present invention will be described below with reference to the attached drawings.
[Basic Configuration of an Information Display System]
A basic configuration of an information display system according to the first embodiment of the present invention will be described with reference to FIG. 5 and FIG. 6.

The information display system according to the first embodiment of the present invention includes a display device 10, a pointing device 20, and a control device 30.

The display device 10 can be achieved by a head-mounted display. The display device 10 has a camera in a direction of view in order to take a picture of an object seen in the direction of view. It is also possible to provide a position sensor and a direction sensor in order to judge an object seen in front of eyes. As an example of the position sensor, a GPS (Global Positioning System) and so on can be considered. As an example of the direction sensor, an electronic compass and so on can be considered. Here, the display device 10 identifies a current position by using the GPS, and recognizes a direction to which the camera is directed by using the electronic compass. Practically however, the display device 10 is not limited to these examples. Here, the display device 10 should be able to identify and detect an object which can be seen through a translucent display by linking the object to a coordinate value in the head-mounted display. For this reason, a sensor which can recognize an object and a position of the object, e.g. an ultrasonic sensor and a directive RFID tag detecting unit, may also be used instead of the camera, the position sensor and the direction sensor provided to the display.

The pointing device 20 can be achieved by a pointing device/pointing medium for a user to point an object (including a person). A user of the pointing device 20 may be different from a user of the display device 10. The pointing device 20 has directivity and a shape suitable for a user to point an object (a shape with which an object can be easily pointed). Here, a "wand", which is a rod-like device, is considered as the pointing device 20. Practically however, the pointing device 20 is not limited to a rod-like device but also can be a device of a mobile terminal type and a device with a shape to be worn on a finger, an arm, and a body (e.g. a finger ring type, a wristwatch type, and pendant/badge types). A movable antenna-like device provided to the sides and the frame of the display device 10 may be also available. That is to say, any shape is possible. The pointing device 20 emits an electromagnetic wave so that a user can easily point (accurately point) an object. For example, it is possible to provide a laser pointer at the tip of the pointing device 20 and emit a laser beam. However, it is not essential to emit an electromagnetic wave. Additionally, a sound wave (an elastic wave) and so on may also be used instead of an electromagnetic wave. The pointing device 20 may have a sensor and a camera.

The control device 30 can be achieved by an electronic device which operates by program control. The control device 30 communicates with the display device 10 and the pointing device 20. The control device 30 may be provided in the display device 10 or the pointing device 20. At that time, the display device 10, the pointing device 20 and the control device 30 may be unified. The control device 30 may communicate/work with the display device 10 and the pointing device 20 through a communication line as an external server.

[Display Device]

Here, the details of the configuration of the display device 10 will be described.

The display device 10 includes a picture inputting section 11, a picture-shot object identification information acquiring section 12 and an additional information outputting section 13.

The picture inputting section 11 can be achieved by a camera. The picture inputting section 11 shoots pictures of real space in real time and acquires a picture which includes an object (a real object) in real space to input the picture to the display device 10 and the control device 30. For example, the picture inputting section 11 acquires a picture at all times/regularly/each time a picture-shot range is changed in accordance with user's way of moving (movement, operation) and inputs the picture to the display device 10 and the control device 30. As an example of the object in real space, actual scenery, a historic site, a person, a building, a moving object, a commodity and so on within the picture-shot range can be considered. Note that the picture is not limited to a moving picture but also may be a still image. Practically however, the picture is not limited to these examples.

The picture-shot object identification information acquiring section 12 acquires a position component and a direction component of the picture inputting section 11 provided to the display device 10. For example, the picture-shot object identification information acquiring section 12 acquires sensor information from a sensor embedded in a camera provided to a head-mounted display, and acquires a position component and a direction component of the camera. More specifically, the picture-shot object identification information acquiring section 12 acquires output of a position sensor and a direction sensor embedded in the picture inputting section 11, thereby acquiring the position component and the direction component of the picture inputting section 11 provided to the display device 10, as the sensor information. Additionally, the picture-shot object identification information acquiring section 12 may acquire a picture taken by the picture inputting section 11. Here, the position component of the picture inputting section 11 is a current position of the display device 10. The direction component of the picture inputting section 11 is a direction to which the camera is directed.

The additional information outputting section 13 can be achieved by a semi-transmissive screen and a picture projecting device. The additional information outputting section 13 superimposes additional information on actual scenery, a person, an object and so on seen through the back of the semi-transmissive screen and displays them. Note that the additional information is not limited to character information but also may be image information (visual information) of a still image/moving picture and so on. The additional information outputting section 13 may also output voice information from a voice outputting device provided to the display device 10 as the additional information. As an example of the voice outputting device, a speaker, an earphone, a headphone and so on can be considered. Additionally, the additional information outputting section 13 may display a picture taken by the picture inputting section 11 when needed. When a screen other than a semi-transmissive screen is used for example, it is necessary to display a picture taken by the picture inputting section 11 since an object and so on cannot be seen through the back of the screen. Practically however, the additional information outputting section 13 is not limited to these examples.

[Object Pointing Device]

The details of the configuration of the pointing device 20 will be described.

The pointing device 20 includes an object pointing section 21 and a pointed object identification information acquiring section 22.

The object pointing section 21, which is positioned at the tip of a wand, is a portion (a tip portion) for a user to point an object. The object pointing section 21 may have a position sensor and a direction sensor. Alternatively, the object pointing section 21 may have a device for emitting a laser beam, a high-frequency wave, a low-frequency wave and so on, and emit a laser beam, a high-frequency wave, a low-frequency wave in order to recognize a pointed object. Additionally, the object pointing section 21 may have a camera. Furthermore, these may be combined. Practically however, the object pointing section 21 is not limited to these examples.

The pointed object identification information acquiring section 22 acquires information for identifying an object pointed by the object pointing section 21. For example, the pointed object identification information acquiring section 22 acquires a position component and a direction component of the object pointing section 21 from a position sensor and a direction sensor provided to the object pointing section 21. Alternatively, the pointed object identification information acquiring section 22 may acquire a measurement result of a reflected light of a laser beam and a reflected wave of a high-frequency wave/a low-frequency wave emitted from the object pointing section 21. The pointed object identification information acquiring section 22 may also acquire a picture from a camera provided to the object pointing section 21. Furthermore, these may be combined. Practically however, the pointed object identification information acquiring section 22 is not limited to these examples.

[Central Processing Device]

The details of the configuration of the control device 30 will be described.

The control device 30 includes a picture analyzing section 31, a target object position calculating section 32, an additional information extracting section 33, a storage section 34, and an additional information output controlling section 35.

The picture analyzing section 31 analyzes a picture obtained from the display device 10, recognizes and identifies an object (including a person) in the picture and makes mapping information which shows the correspondence relationship between each recognized and identified object and a position of each object in the picture. In the case that a virtual object is related to a preliminarily-stored object image, virtual mapping information including the virtual object is made. Similarly, in the case of acquiring a picture from the pointing device 20, the picture analyzing section 31 analyzes the picture, and recognizes and identifies an object in the picture. For example, the picture analyzing section 31 checks an object in a picture with a preliminarily-stored object image, recognizes and identifies the object in the picture and makes mapping information which shows the correspondence relationship between the recognized and identified object and a position of the object in the picture.

Here, the picture analyzing section 31 makes the mapping information which shows the correspondence relationship between the "identified object" and the "position information in the picture" in real time. For example, the picture analyzing section 31 makes and updates the mapping information at all times/regularly/when there is a change in the picture in accordance with user's way of moving (movement, operation). The picture analyzing section 31 temporarily stores the mapping information in a buffer and so on. Alternatively, the picture analyzing section 31 may stores the mapping information in the storage section 34 mentioned later. The picture analyzing section 31 may delete the mapping information when the identified object no longer exists in the picture. Note that the "position information in the picture" is nothing but an example, and practically, "position information on the semi-transmissive screen" may be also available. Basically, since the "position information in the picture and the "position information on the semi-transmissive screen" correspond to each other, the picture analyzing section 31 just should use any of the above position information.

In the case that a virtual object is displayed on the display device 10, the picture analyzing section 31 preliminarily/at the time of display, makes virtual mapping information which shows the correspondence relationship between an "identified object", a "preliminarily-stored virtual object", and "position information in the picture". In the case that a position of the virtual object in the picture changes, the picture analyzing section 31 makes and updates the virtual mapping information in real time. The picture analyzing section 31 temporarily stores the virtual mapping information in a buffer and so on. Alternatively, the picture analyzing section 31 may store the virtual mapping information in the storage section 34 mentioned later. When the virtual object is no longer displayed on the display device 10, the picture analyzing section 31 may delete the virtual mapping information.

In the case that an object is pointed by the pointing device 20, the target object position calculating section 32 calculates "position information in the picture" (a displayed coordinate value) for the pointed object based on information from the display device 10 and information from the pointing device 20.

A calculation example of position information in a picture in the case that an object is pointed by the pointing device will be described below.

(1) Calculation of Position Information by Using a Position Sensor and a Direction Sensor The target object position calculating section 32 recognizes an picture-shot range of the picture inputting section 11 based on a position component and a direction component acquired from the pointed object identification information acquiring section 22, a position component and a direction component acquired from the picture-shot object identification information acquiring section 12 and an angle of view of the camera of the picture inputting section 11. The target object position calculating section 32 finds a portion where the position component and the direction component acquired from the pointed object identification information acquiring section 22 overlap with a line segment based on the position component and the direction component acquired from the picture-shot object identification information acquiring section 12 in the picture-shot range. In the case that there is an overlapping portion, the target object position calculating section 32 calculates "position information in the picture" of the pointed object from the picture-shot range of the picture input device 11. After that, the "position information in the picture" of the pointed object is checked with "mapping information" (a position of each object in a picture) and an object at an agreed position is identified as the pointed object. This calculation method is described later as "calculation of position information by a position sensor and a direction sensor".

Incidentally, in the case that an object pointed by the pointing device 20 does not exist in real space but is an virtual object displayed only on the semi-transmissive screen of the display device 10, the target object position calculating section 32 recognizes an picture-shot range of the picture inputting section 11 based on a position component and a direction component acquired from the pointed object identification information acquiring section 22, a position component and a direction component acquired from the picture-shot object identification information acquiring section 12 and an angle of view of the camera of the picture inputting section 11. The target object position calculating section 32 finds a portion where the position component and the direction component acquired from the pointed object identification information acquiring section 22 overlap with a line segment based on the position component and the direction component acquired from the picture-shot object identification information acquiring section 12 in the picture-shot range. In the case that there is an overlapping portion, the target object position calculating section 32 calculates "position information in the picture" of the pointed object from the picture-shot range of the picture input device 11. After that, the "position information in the picture" of the pointed object is checked with a position of a virtual object of virtual mapping information in the picture, and a virtual object at an agreed position is identified as the pointed object.

(2) Calculation of Position Information by Checking Based on Visual Feature

The target object position calculating section 32 acquires pictures from the pointed object identification information acquiring section 22 and the picture-shot object identification information acquiring section 12, respectively, and finds a portion where a visual feature of the picture acquired from the pointed object identification information acquiring section 22 and a visual feature of the center of the picture acquired from the picture-shot object identification information acquiring section 12 are similar. In the case that there is a portion where the visual features are similar, the target object position calculating section 32 obtains "position information in the picture" for the pointed object. After that, the "position information in the picture" of the pointed object is checked with "mapping information" (a position of each object in a picture) and an object at an agreed position is identified as the pointed object. This calculation method is described later as "calculation of position information by checking based on visual features".

The additional information extracting section 33 extracts additional information on an identified object from the storage section 34. The additional information extracting section 33 can also extract additional information on a pointed object in the case that an object (including a virtual object) is pointed by the pointing device 20.

The storage section 34 stores additional information on an object. The storage section 34 may be an external storage device. The storage section 34 may also be provided on a server connected through a network. The storage section 34 may also take the form of a database (DB: DataBase) in which position information and image information are combined. The storage section 34 may store the above mapping information and virtual mapping information.

The additional information output controlling section 35 performs control of displaying/non-displaying of additional information for an object pointed by the pointing device 20 among actual objects seen through the back of the semi-transmissive screen of the display device 10.

Incidentally, in the case that an object for additional information control is identified and selected (an object exists at the position) when "position information in the picture" is identified, the additional information output controlling section 35 may perform display control to easily understand for a user on the display device 10 by framing an object in the vicinity of "position information in the picture" for example.

Alternatively, in the case that an object for additional information control is not identified and selected (an object does not exist at the position or an object cannot be identified) when "position information in the picture" is identified, the additional information output controlling section 35 may perform display control to easily understand for a user on the display device 10 by framing an object in the vicinity of "position information in the picture" for example.

In the case that resolution of an input image of the picture inputting section 11 and resolution of the additional information outputting section 13 are different, the additional information output controlling section 35 performs the correction of the resolution.

[Supplement: User Assistance by Regarding an Object Around a Pointed Position as a Candidate]

The target object position calculating section 32 may calculate "position information in the picture" not only for an object pointed by the pointing device 20 but also for an object in the vicinity of a position (coordinate values) estimated to be pointed by the pointing device 20. As a result, the additional information output controlling section 35 performs highlight display for the object in the vicinity of the coordinates pointed by the pointing device 20 for example, thereby making it possible to assist user pointing by the pointing device 20.

[Examples of Hardware]

The control device 30 can be achieved by a processor which is driven based on a program and performs given processing, a memory which stores the program and various data and a communications interface (I/F: Interface) which performs communication through a communication line.

As an example of the above processor, a CPU (Central Processing Unit), a network processor (NP: Network Processor), a microprocessor, a micro-controller, a semiconductor integrated circuit (IC: Integrated Circuit) having a dedicated function and so on can be considered.

As an example of the above memory, a semiconductor memory device such as a RAM (Random Access Memory), a ROM (Read Only Memory), an EEPROM (Electrically Erasable and Programmable Read Only Memory) and a flash memory, an auxiliary storage device such as an HDD (Hard Disk Drive) and an SSD (Solid State Drive), a removable disk such as a DVD (Digital Versatile Disk), a storage medium such as an SD memory card (Secure Digital memory card) and so on can be considered. A buffer and a register may be also available. A storage device which uses DAS (Direct Attached Storage), FC-SAN (Fibre Channel-Storage Area Network), NAS (Network Attached Storage), IP-SAN (IP-Storage Area Network) and so on may be also available.

The above processor and the above memory may be unified. For example, a single-chip microcomputer has been developed in recent years. Therefore, there can be a case that a single-chip microcomputer provided in an electronic device and so on has the above processor and memory.

As an example of the above communications interface, such a semiconductor integrated circuit as a substrate (a mother board, an I/O board) and a chip capable of communication, a network adapter such as an NIC (Network Interface Card) and similar expansion cards, a communication device such as an antenna, a communication port such as a connection port (a connector) and so on can be considered.

As an example of a communication line, the Internet, a LAN (Local Area Network), a wireless LAN, a WAN (Wide Area Network), a backbone (Backbone), a cable television (CATV) line, a fixed-line telephone network, a mobile telephone network, WiMAX (IEEE 802.16a), 3G (3rd Generation), a lease line, IrDA (Infrared Data Association), Bluetooth (registered trademark), a serial communication line, a data bus and so on can be considered.

Each section (internal parts) of the control device 30 may be a module, a component or a dedicated device, or may be a start-up (invoking) program for these.

Practically however, they are not limited to these examples.

[Overview of Information Display Processing]

Figure 7:
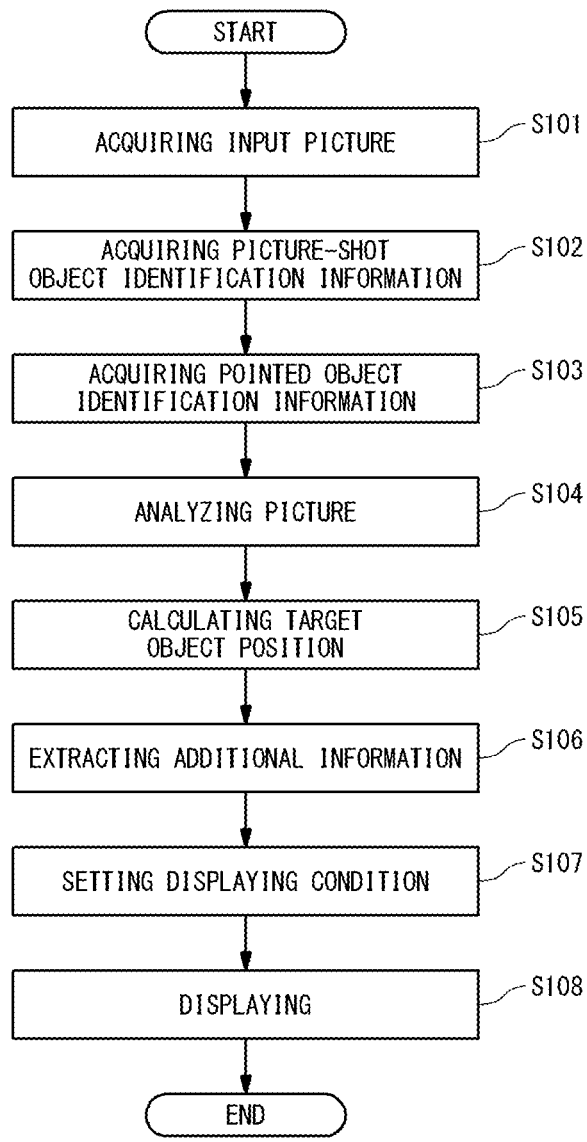
FIG. 7 is a flowchart explaining an overview of information display processing.

Next, an overall operation according to the present embodiment will be described in detail with reference to a flowchart in FIG. 7.

(1) Step S101

The picture inputting section 11 takes an image of an actual object seen through the back of the semi-transmissive screen of the display device 10, and inputs a picture obtained as a result of the picture-shooting.

(2) Step S102

The picture-shot object identification information acquiring section 12 acquires a position component and a direction component of the picture inputting section 11 provided to the display device 10. For example, the picture-shot object identification information acquiring section 12 acquires sensor information from sensors embedded in the camera provided to the head-mounted display. Specifically, the picture-shot object identification information acquiring section 12 acquires output of a position sensor such as a GPS and a direction sensor such as an electronic compass, thereby acquiring a position component and a direction component of the picture inputting section 11 provided to the display device as the sensor information. Alternatively, the picture-shot object identification information acquiring section 12 acquires a picture from the picture inputting section 11 provided to the display device 10.

(3) Step S103

In the case that a user points an object (including a virtual object) with the object pointing section 21, the pointed object identification information acquiring section 22 acquires information for identifying the pointed object. For example, the pointed object identification information acquiring section 22 acquires sensor information from sensors embedded in the object pointing section 21. Specifically, the pointed object identification information acquiring section 22 acquires output of a position sensor such as a GPS and a direction sensor such as an electronic compass, thereby acquiring a position component and a direction component of the object pointing section 21 as the sensor information. Alternatively, the pointed object identification information acquiring section 22 acquires a picture from a camera embedded in the object pointing section 21.

(4) Step S104

The picture analyzing section 31 analyzes a picture inputted by the picture inputting section 11 of the display device 10, and identifies objects included in the inputted picture and positions of the objects in the picture. At that time, the picture analyzing section 31 may acquire a picture directly from the picture inputting section 11. When identifying an object, the picture analyzing section 31 extracts a visual feature amount of each object in the picture by using the inputted picture and checks the extracted visual feature amount with preliminarily-prepared image information of each object, thereby identifying the objects. The picture analyzing section 31 may acquire a position of a user and time information together with a picture in order to identify an object and use a preliminarily-prepared incidental information of an object (information on a place, time and so on of existence of an object) to narrow down a target object from objects included in an inputted picture.

(5) Step S105

In the case that a user points an object with the object pointing section 21, the target object position calculating section 32 calculates position information in the picture of the pointed object based on a position component and a direction component acquired from the pointed object identification information acquiring section 22, a position component and a direction component acquired from the picture-shot object identification information acquiring section 12 and an angle of view of the camera of the picture inputting section 11. In the case that the position information in the picture of the pointed object is coincide with any position in the picture of the objects acquired from the picture analyzing section 31, an object at an agreed position is identified as the pointed object. In the case that the position information in the picture of the object pointed by the object pointing section 21 is coincide with a position in the picture of the virtual object acquired from the picture analyzing section 31 (displayed only on the display device 10), the virtual object is identified as the pointed object.

(6) Step S106

In the case that the user does not point an object with the object pointing section 21, the additional information extracting section 33 extracts additional information of the identified object from the storage section 34 based on information on the identified object. In the case that the user points an object with the object pointing section 21, the additional information extracting section 33 may extract additional information of the pointed object from the storage section 34 based on information on the pointed object. In the case that the already-extracted "additional information of the identified object" is used as the "additional information of the pointed object", the "additional information of the pointed object" does not have to be extracted from the storage section 34.

(7) Step S107

When the user does not point an object with the object pointing section 21, the additional information output controlling section 35 determines a display position of the "additional information" extracted by the additional information extracting section 33 based on the "position information in the picture of the identified object". In the case that the user points an object with the object pointing section 21 on the other hand, a display position of the "additional information" extracted by the additional information extracting section 33 is determined based on the "position information in the picture of the pointed object" calculated by the target object position calculating section 32. The additional information output controlling section 35 may determine a preliminarily-set position (e.g. 100 pixels downward) as a display position of additional information, with a position of an identified object/pointed object as a reference, or may select a place with space (room) where additional information is displayed from places with no object based on position relationship among a plurality of objects in a picture to determine the selected place as a display position. When displaying additional information, the additional information output controlling section 35 may display additional information in a display size (display range) which corresponds to a pointed object or in a predetermined display size, or may display additional information by dynamically changing a display size in accordance with an amount of additional information.

(8) Step S108

The additional information outputting section 13 displays the additional information in accordance with the display position and the display size determined by the additional information output controlling section 35. The additional information outputting section 13 may display a picture taken by the picture inputting section 11 when needed.

[Display Examples of Additional Information]

Display examples will be described below in the case that additional information on a person "Yamada ▼▼" is newly displayed after additional information on a temple "●● Temple", a person "Suzuki ■■", and a stone monument "▲▲ Monument" is displayed.

[Display Example of Additional Information (1)]

Figure 8:
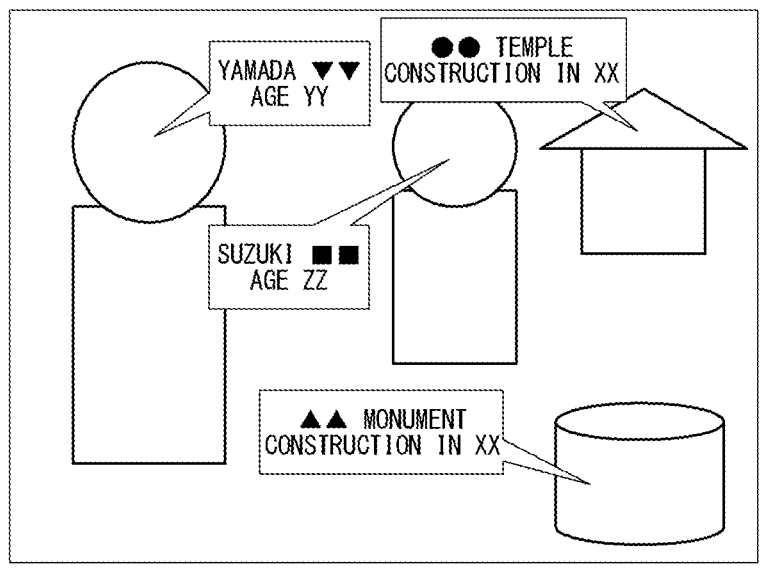
FIG. 8 is a view showing a display example in the case that display control of additional information is not performed.

FIG. 8 is a display example in the case that display control of additional information is not performed. Here, pieces of additional information on "●● Temple", "Suzuki ■■", "▲▲ Monument" and "Yamada ▼▼" are equally displayed.

[Display Example of Additional Information (2)]

Figure 9:
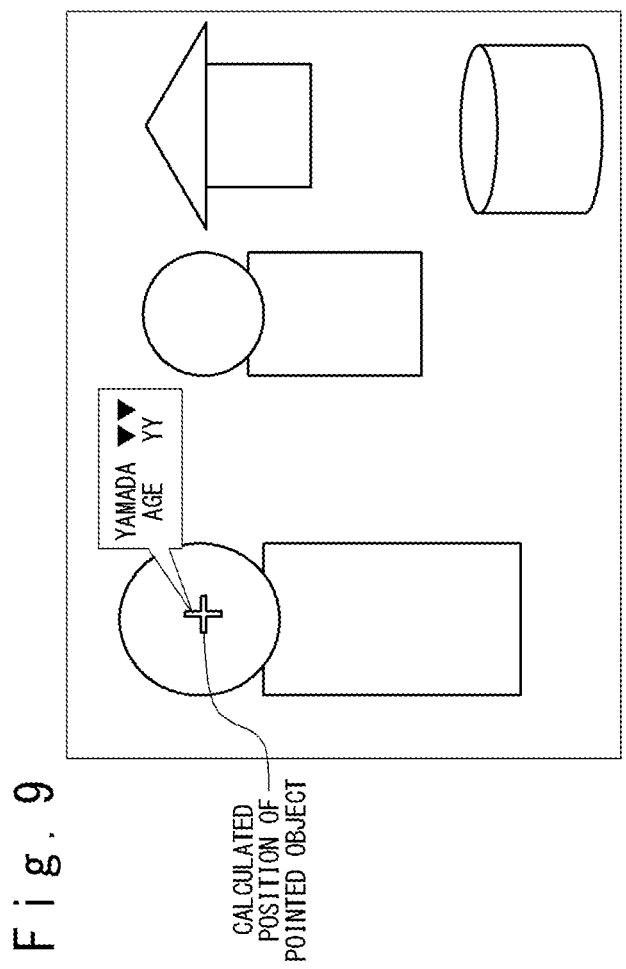
FIG. 9 is a view showing a display example in the case that additional information of only a pointed object is displayed.

FIG. 9 is a display example in the case that only additional information of a pointed object is displayed. Here, only additional information on "Yamada ▼▼" is displayed.

[Display Example of Additional Information (3)]

Figure 10:
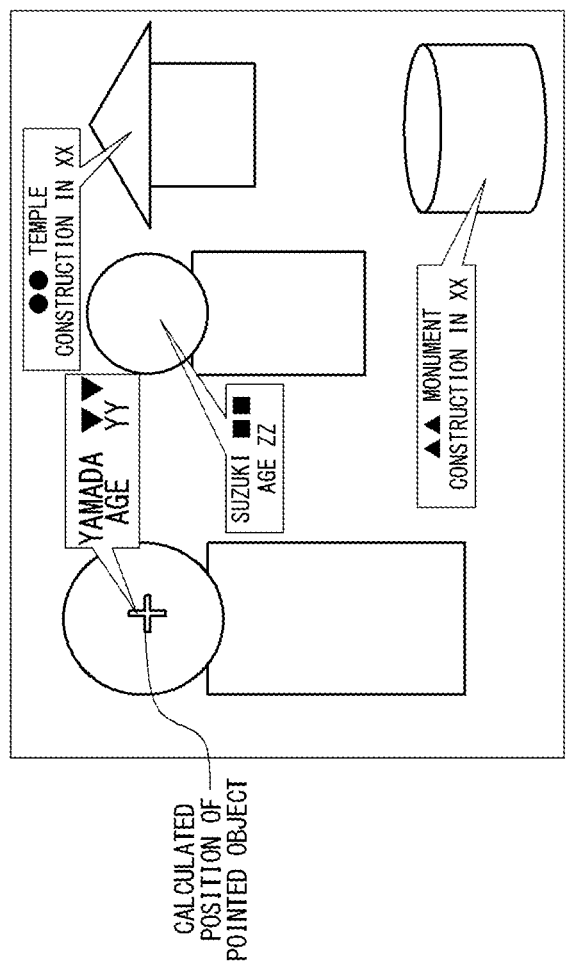
FIG. 10 is a view showing a display example in the case that additional information of only a pointed object is displayed large and additional information of other objects are displayed small.

FIG. 10 is a display example in the case that only additional information of a pointed object is displayed relatively large and additional information of the other objects is displayed relatively small. Here, only the additional information on "Yamada ▼▼" is displayed relatively large, and the additional information on "●● Temple", "Suzuki ■■", and "▲▲ Monument" is displayed relatively small. In the case that additional information of a pointed object is displayed larger than a normal display size, additional information of other objects may be displayed in the normal display size. Note that change in a display size is nothing but an example. Practically, it is just necessary to display additional information of a pointed object, by emphasizing only the additional information of the pointed object in some way so that the additional information of the pointed object can be recognized. For example, letters and a display frame of additional information of a pointed object may be changed to heavy line (bold face)/color/blinking display.

[Change in Pointed Direction]

The control device 30 dynamically changes additional information displayed on the display device 10 as a user operates the pointing device 20 to change a pointed object. For example, in the case that the user slides the pointing device 20, the target object position calculating section 32 may calculate current position information in the picture relatively from the previous position information in the picture based on an amount of change in a position component and a direction component of the pointing device 20 as a result of the movement. The additional information output controlling section 35 may also display an AR marker (hereinafter referred to as a marker) at a focus position in the picture which the user points by operating the pointing device 20, or may perform, at a focus position in the picture, only displaying/non-displaying of additional information of an object at the position instead of displaying a marker. Here, a marker is exemplified as a cursor.

For example, it is possible to easily control additional information to be displayed, by providing a pointing button to a wand (the object pointing section 21) for change of displaying/non-displaying of additional information so that a user operates the wand (object pointing section 21) to successively change a target object of which additional information is displayed and presses the pointing button to perform pointing inputting.

[Additional Configuration of Information Display System]

Figure 11:
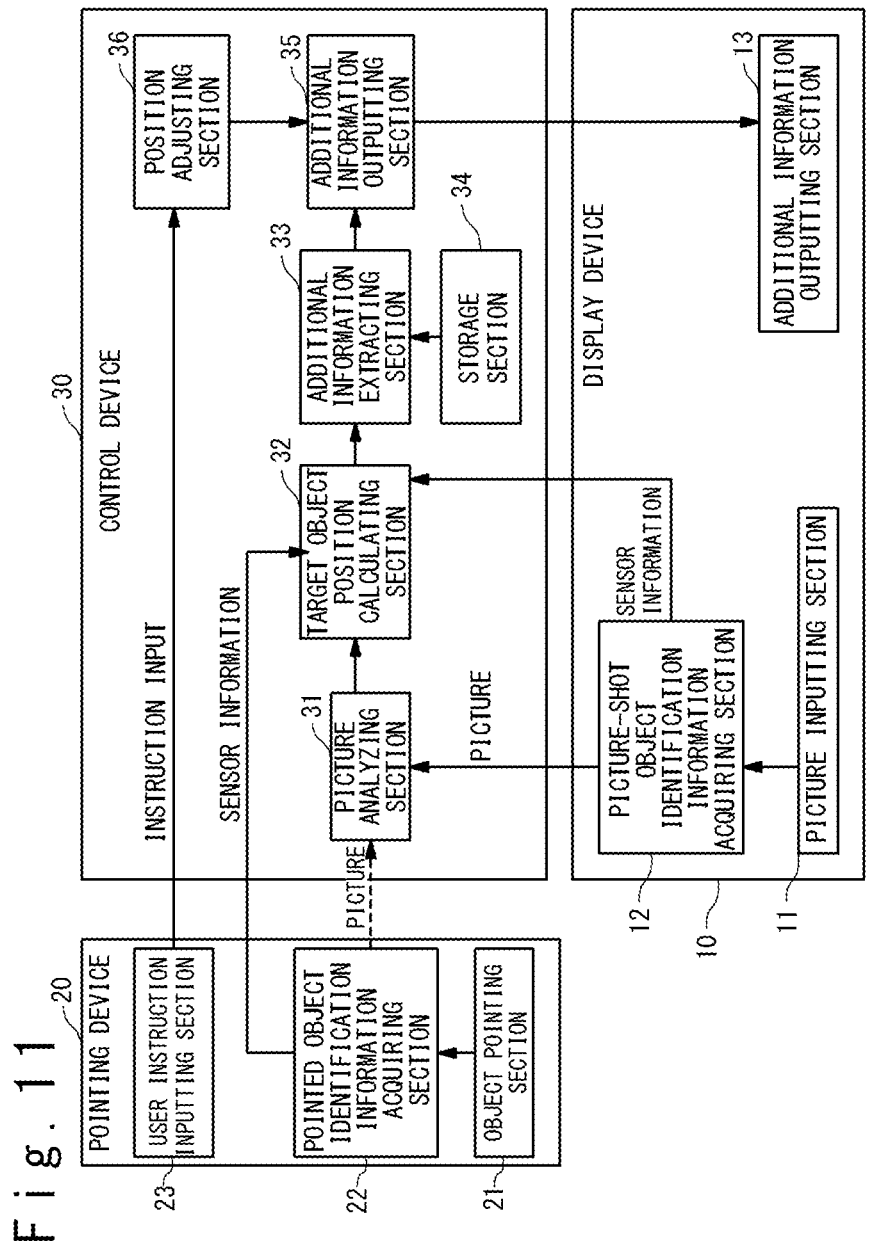
FIG. 11 is a view showing an additional configuration of the information display system according to the first embodiment of the present invention.

An additional configuration of the information display system in the above case will be described with reference to FIG. 11.

The pointing device 20 further includes a user instruction inputting section 23.

The user instruction inputting section 23 can be achieved by a button which can be pressed, a touch panel, and so on. The user instruction inputting section 23 performs pointing inputting to the display device 10 based on user's operation such as pressing of a button.

The control device 30 further includes a position adjusting section 36.

The position adjusting section 36 adjusts display of additional information to be displayed based on pointing inputting from the pointing device 20. Here, the position adjusting section 36 changes displaying or non-displaying/possible or impossible to display of additional information, a display position and a display size based on the pointing inputting from the user instruction inputting section 23. Note that the position adjusting section 36 may be a part of the additional information output controlling section 35. That is to say, the additional information output controlling section 35 may have a function of the position adjusting section 36.

[Device for Display Device]

Figure 12:
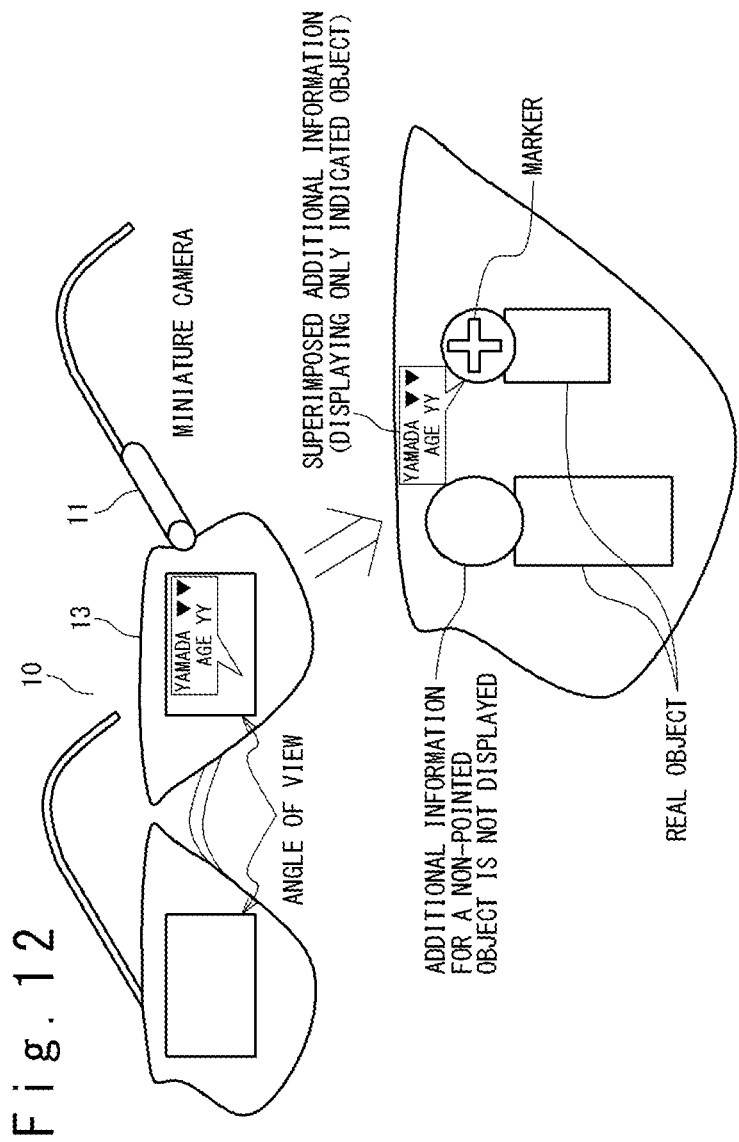
FIG. 12 is a view showing an example of a device for a display device.

An example of a device for the display device 10 is shown in FIG. 12.

The picture inputting section 11, which is a camera attached to a temple of eye glasses, acquires information inputted to a visual field of a user and sends the acquired information to the control device 30 in a wireless/wired manner. Here, the picture inputting section 11 includes sensors which detect a position component and a direction component in addition to the camera. The sensor corresponds to the picture-shot object identification information acquiring section 12. Note that the sensors may be embedded in a rim (frame) of eye glasses, a camera, or a lens.

The additional information outputting section 13 has a shape of eye glasses, the lenses of the eye glasses being a translucent display, and performs control such that additional information is displayed on the display. Here, a real object (two persons, in this example) can be seen through the lenses of the eye glasses. Additionally, a rectangular area shown on the lenses of the eye glasses (the translucent display) agrees with an angle of view of a taken picture. The additional information outputting section 13 may perform control such that only a picture is displayed and a rectangular area itself is not displayed, or may perform control such that a frame of a rectangular area is displayed together with a picture. The additional information outputting section 13 receives additional information to be displayed from the control device 30 in a wireless/wired manner, and displays the additional information in the rectangular area shown on the lenses.

Here, the additional information outputting section 13, where a real object (two persons, in this case) is seen through the lenses of the eye glasses, displays a marker at a position (one person) which a user points with the object pointing section 21.

The additional information extracting section 33 extracts additional information of an object to which a marker is displayed from the storage section 34. The additional information output controlling section 35 performs display control for displaying the extracted additional information on the translucent display.

[Methods of Calculating Position in Picture]

Next, examples of "methods of calculating a position in a picture of a pointed object" by the target object position calculating section 32 will be described in detail.

[Calculation of Position Information by a Position Sensor and a Direction Sensor]

Figure 13:
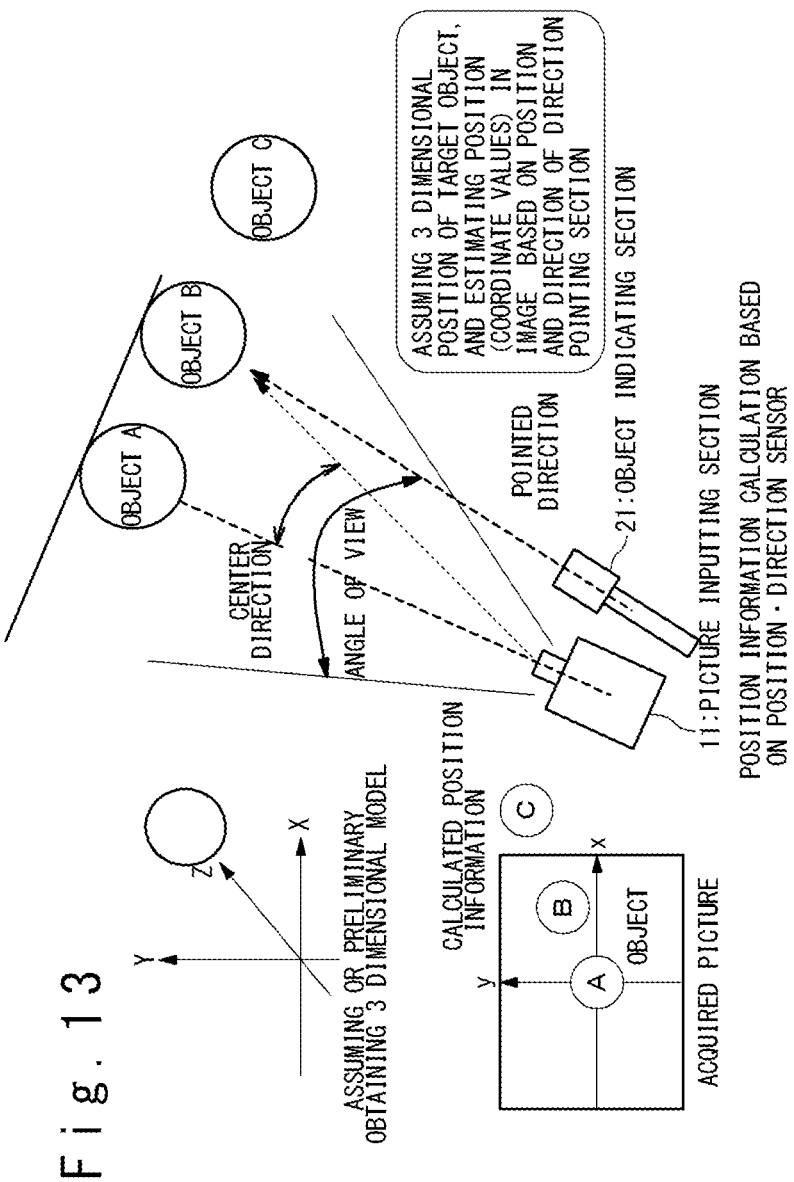
FIG. 13 is a view explaining an overview of position information calculation by using a position sensor and a direction sensor.
Figure 14:
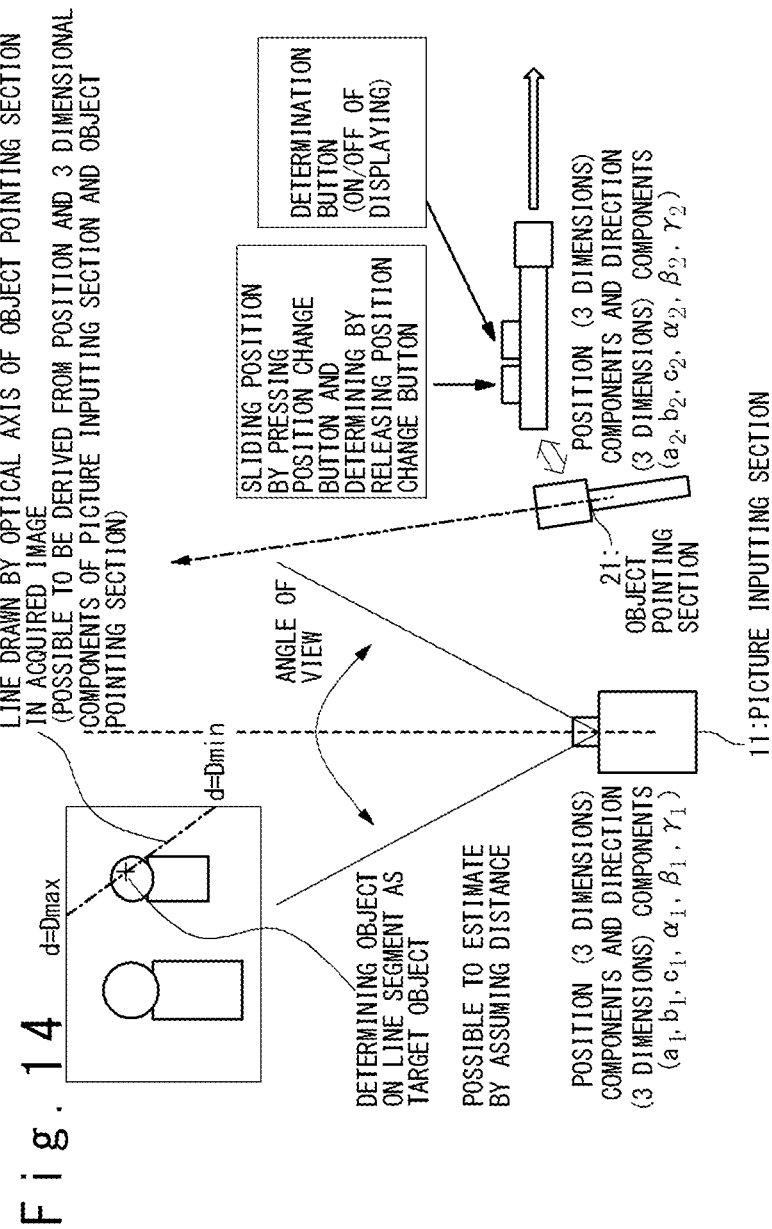
FIG. 14 is a view explaining details of position information calculation by using a position sensor and a direction sensor.

FIG. 13 and FIG. 14 show a derivation principle when a position component and a direction component of the picture inputting section 11 are acquired by the picture-shot object identification information acquiring section 12, and a position component and a direction component of the object pointing section 21 are acquired by the pointed object identification information acquiring section 22.

An pointing direction of the object pointing section 21 is displayed as an optical axis (a line segment) on the translucent display. At this time, the additional information outputting section 13 may display a laser beam emitted by the object pointing section 21 as the optical axis, and may display an imaginary optical axis only on the translucent display, based on a position component and a direction component of the object pointing section 21.

The picture-shot object identification information acquiring section 12 regards the position of the picture inputting section 11 as the origin (the absolute position) of three dimensions, a horizontal direction (right-left direction) of an angle of view of the picture inputting section 11 as the X-axis, a vertical direction (up-down direction) of the angle of view of the picture inputting section 11 as the Y-axis, and a central direction of the angle of view of the picture inputting section 11 and the optical axis direction (the depth direction) of the object pointing section 21 as the Z-axis.

Here, the picture-shot object identification information acquiring section 12 can determine coordinate values of an object existing at a specific place on an image from the center coordinates "(x1, y1, z1)" and the angle of view (the field of view) of the camera of the picture inputting section 11.

The additional information outputting section 13 displays an object which exists within an angle of view in an acquired picture. When an object exists on an optical axis, the additional information outputting section 13 may display the object on the optical axis at the center of an acquired picture.

When "(x, y)" at a point of the maximum angle of view in the case of "Z=Z1" is "(x0, y0)", the size of an acquired image is assumed to be "(xm, ym)".

The display position in this case therefore, when the number of pixels from the center is assumed to be "(xm)/2, (ym)/2", is expressed by a value from the center "(x, y)=((x1×xm)/(2×x0), (y1×ym)/(2×y0))". Note that "x" is a multiplication sign (a multiplication operator). Additionally, "/" is a division sign (a division operator).

When a direction component of the picture inputting section 11 is assumed to be "($\alpha$1, $\beta$1, $\gamma$1)" and a direction component of the object pointing section 21 is assumed to be "($\alpha$2, $\beta$2, $\gamma$2)", a direction component of the object pointing section 21 is expressed as "($\alpha$2-$\alpha$1, $\beta$2-$\beta$1, $\gamma$2-$\gamma$1)" when an optical axis direction of the picture inputting section 11 is assumed to be the Z-axis.

When a position component (the absolute position) of the picture inputting section 11 is assumed to be "(a1, b1, c1)" and a position component of the object pointing section 21 is assumed to be "(a2, b2, c2)", a position component of the object pointing section 21 is expressed as "(a2-a1, b2-b1, c2-c1)".

A line segment (a straight-line component) extending from the tip of the object pointing section 21 is described by "(a2-a1, b2-b1, c2-c1)" which is a position component of the object pointing section 21, "($\alpha$2-$\alpha$1, $\beta$2-$\beta$1, $\gamma$2-$\gamma$1)" which is a direction component of the object pointing section 21 and an angle of view of the camera of the picture inputting section 11, and expressed as a straight line in an acquired picture. The line segment extends towards infinity.

[Patterns of Line Segment]

Figure 15:
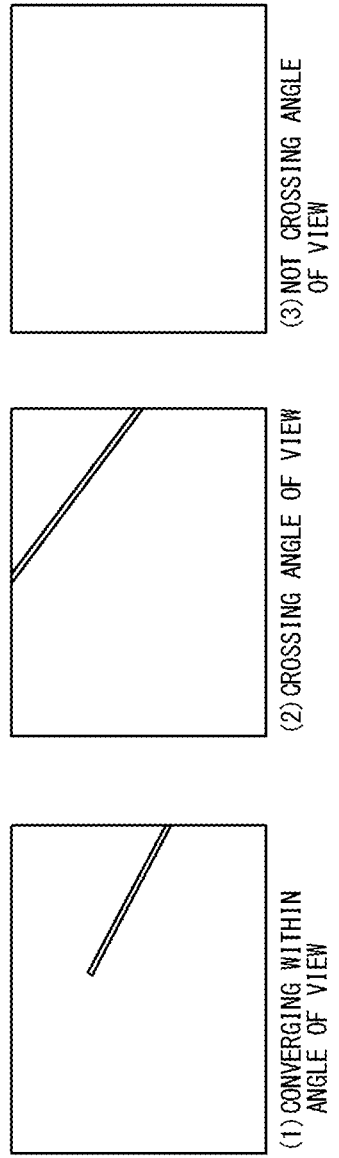
FIG. 15 is a view explaining patterns of a line segment, where (1) shows a pattern where a line segment converges within an angle of view, (2) shows a pattern where a line segment crosses an angle of view, and (3) shows a pattern where a line segment does not cross an angle of view.

As shown in FIG. 15, a line segment extending from the tip of the object pointing section 21 includes the following three patterns (1) to (3).

(1) A line segment converges within an angle of view (a line segment crosses an angle of view, and infinity is within the angle of view).

(2) A line segment crosses an angle of view (a line segment crosses an angle of view, and infinity is outside the angle of view).

(3) A line segment does not cross an angle of view.

When a user points an object with the object pointing section 21, a line segment displayed in an input image is obtained from an angle of view of the camera of the picture inputting section 11, "(a1, b1, c1)" which is a position component of the picture inputting section 11, "($\alpha$1, $\beta$1, $\gamma$1)" which is a direction of the picture inputting section 11, "(a2, b2, c2)" which is a position component of the object pointing section 21 and "($\alpha$2, $\beta$2, $\gamma$2)" which is a direction of the object pointing section 21.

Next, the target object position calculating section 32 can judge position information by regarding a candidate object on an optical axis line which the object pointing section 21 points as a pointed object among a plurality of candidate objects identified by the picture analyzing section 31.

In the case that a plurality of objects exist on a line segment, the target object position calculating section 32 can appropriately select the following ways (1) to (4) since a depth (Z component of an object) can be calculated from a direction component and a position component of both.

(1) A nearer object is selected.

(2) A preferential Z component value is preliminarily determined and an object is selected based on a Z value.

(3) Additional information of both is displayed by regarding both as candidates.

(4) Since a distance to an assumed object can be calculated in the case that a place of a line is determined, an actual size of an object (preliminarily recoded in a DB) and a size on a screen are measured, and only an object of which size information is appropriate is selected as an object on a line segment.

The target object position calculating section 32 may also select any of the above ways (1) to (4) automatically or in accordance with what a user preliminarily specifies/sets.

It may be also available that the user instruction inputting section 23 is provided to the wand (object pointing section 21) so that a user sequentially selects a candidate object on a line segment with the user instruction inputting section 23, and that an interactive interface is prepared in which a marker is moved on a line segment by user's pointing to determine an object which a user wants to point.

Additionally, it is possible to make a user easily understand which object is detected on which criterion, with means such as "displaying/non-displaying of a line segment pointed by the wand (object pointing section 21) can be selected by a user", "a line segment after a target object is determined is not displayed" and so on, as the means at the time of display.

[Calculation of Position Information by Checking Based on a Visual Feature]

Figure 16:
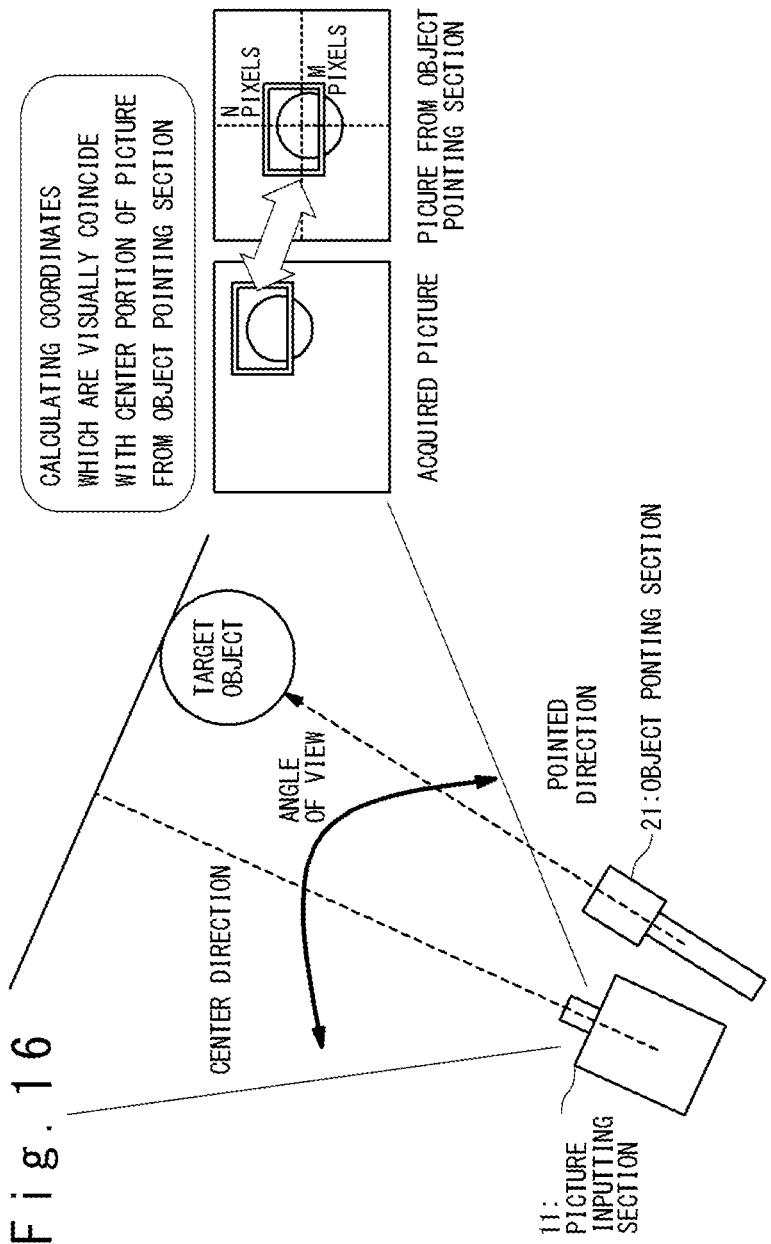
FIG. 16 is a view explaining details of position information calculation by using an image feature.

Next, a method of finding a position of an object based on an image feature is described with reference to FIG. 16.

In this method, a camera is provided at the tip of the object pointing section 21. It may be also available not to provide a position sensor and a direction sensor at the tip of the object pointing section 21.

The object pointing section 21 is provided with the camera at the tip, and a user shoots pictures in an optical axis direction by using the camera.

The picture analyzing section 31 acquires a picture from the picture inputting section 11, analyzes and checks an image in the picture from the picture inputting section 11 and an image of an object stored in the storage section 34, identifies objects in the picture, makes mapping information which shows the relationship between the identified objects and position information in the picture of the objects and notifies the target object position calculating section 32 of the mapping information.

The target object position calculating section 32 checks an image in a picture from the picture inputting section 11 with an image (M pixels by N pixels) displayed at the center of the camera of the object pointing section 21 whether or not a region visually similar exist, calculates position information in the picture, checks the calculated information with mapping information (position information in the picture of each object), and in the case that agreed position information in the picture is found, identifies an object at the position in the picture as the pointed object.

As an example of a method of calculating image similarity, it can be considered to use a "stereo image processing method" described in Japanese Laid Open Patent Application JP-A-Heisei 03-134778.

With the method, it is possible to estimate a position in a picture which is visually nearest to the center portion of the camera as a position pointed by a user.

The target object position calculating section 32, in the case that a region visually similar does not exist, may judge as "not applicable" after performing threshold processing, and in the case that a plurality of candidates exist, may perform processing such as "selecting everything as being correct", "selecting one by a user" and so on.

[Feature of Present Embodiment]

In the present embodiment, the pointing device 20 (wand) has the pointed object identification information acquiring section 22; the display device 10 (display) has the picture inputting section 11 and the picture-shot object identification information acquiring section 12; and the control device 30 (computer) has the target object position calculating section 32. A user can designate an object in which the user is interested in an input image by pointing a target object with the pointing device 20 (wand) at hand.

Consequently, a user can easily perform display control of additional information of an object displayed on a screen, through extremely intuitive operation like pointing a target of interest, without directly touching a screen.

<Second Embodiment>

The second embodiment of the present invention will be described in detail below with reference to the drawings.

In the present embodiment, a user performs correction or minor adjustment of a position on a screen of a pointed object by using a user instruction inputting section 23.

Figure 17:
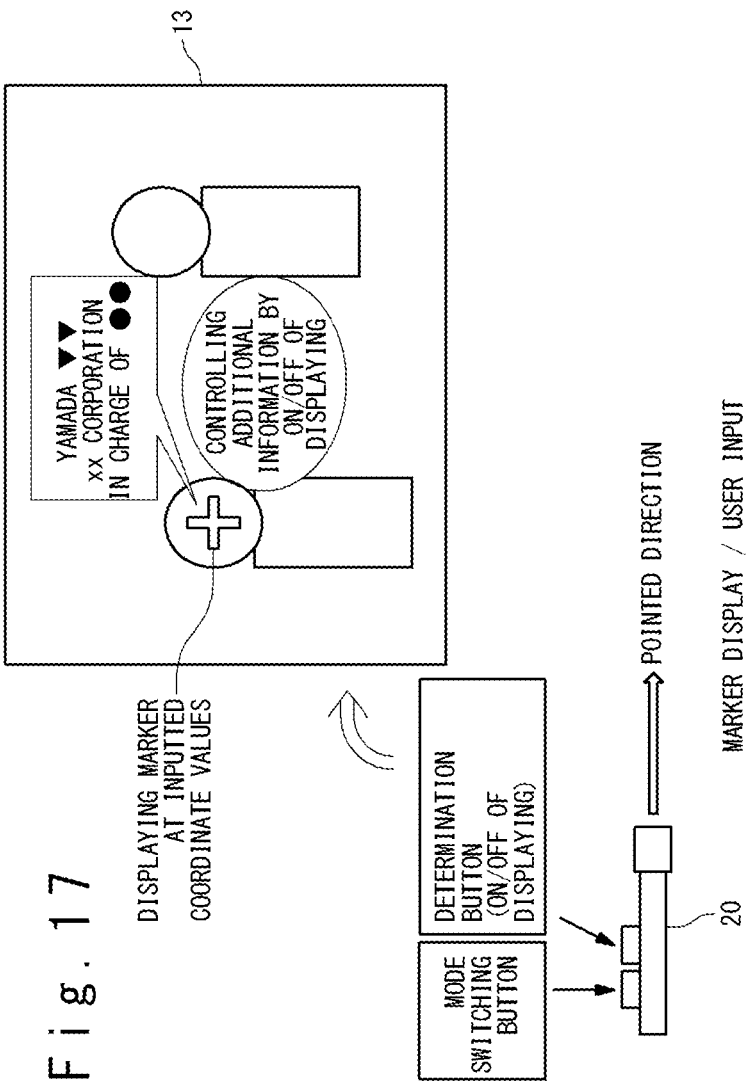
FIG. 17 is a view explaining a second embodiment of the present invention.

As shown in FIG. 17, the user instruction inputting section 23 is achieved by two buttons, which are a "mode switching button" and a "determination button".

[Manual Position Adjustment]

Figure 18:
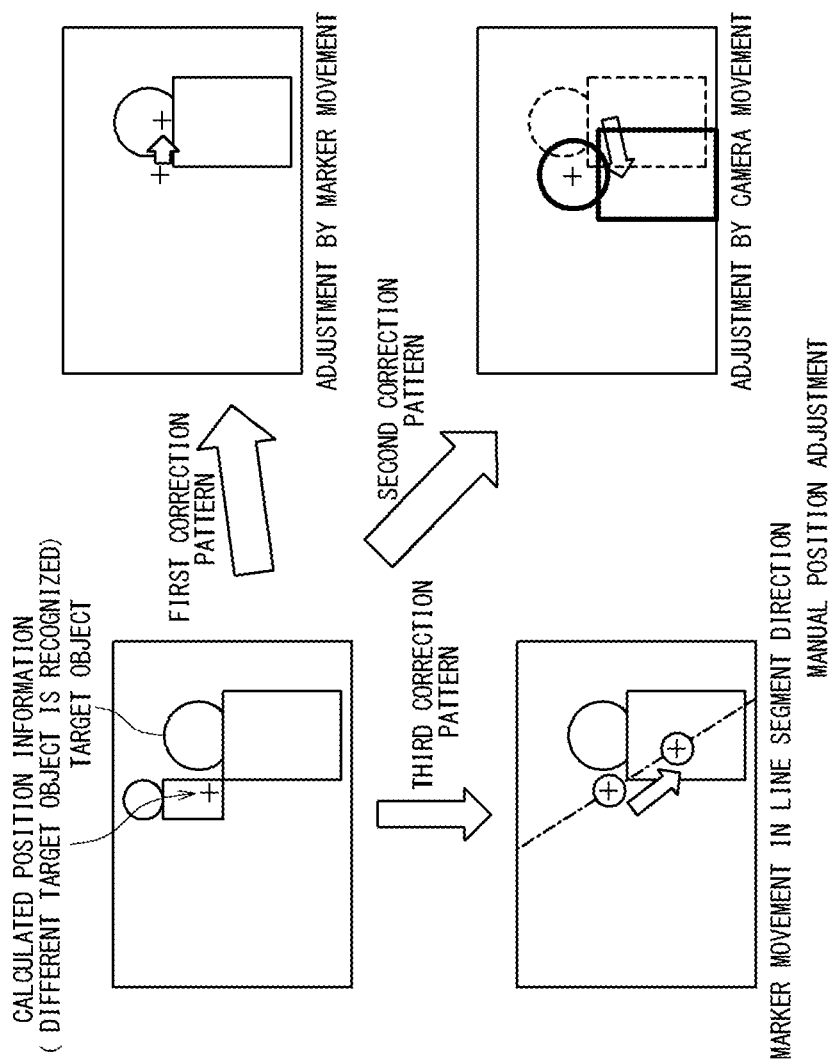
FIG. 18 is a view explaining position adjustment performed manually.

FIG. 18 shows an example of manual position adjustment by a user.

Here, a position calculated by a system is different from a position of user's intention, and a position of a different object is calculated.

[First Correction Pattern: Position Adjustment by Marker Movement]

As a first correction pattern, it can be considered to move a marker position up and down or from right to left on a screen.

For example, a user presses the mode switching button so that the user instruction inputting section 23 changes a mode from a "normal mode" to an "up-down/right-left mode".

The "normal mode" is a mode in which an object can be designated freely. The "up-down/right-left mode" is a mode for adjusting a marker position by moving a pointing device 20 (wand) up and down/from right to left.

In the "up-down/right-left mode", minor adjustment of a marker position is performed by moving the pointing device 20 (wand) up and down/from right to left while pressing (keeping pressing) the mode switching button. After the marker position is adjusted, the position is determined with the determination button. By pressing the determination button when the object and the marker position overlap each other, the marker points the object.

By releasing the mode switching button, the mode returns to the "normal mode".

Here, the mode is switched to the "up-down/right-left mode" by pressing (keeping pressing) the mode switching button and switched to the "normal mode" by releasing the mode switching button. Practically however, the "up-down/right-left mode" and the "normal mode" may be switched by pressing the mode switching button (each time the mode switching button is pressed).

[Second Correction Pattern: Adjustment by Camera Movement]

As a second correction pattern, it can be considered to perform adjustment by camera movement while fixing a marker position (the coordinate values) on a display image.

For example, the mode is set to a "fix mode" by pressing the mode switching button.

The "fix mode" is a mode for fixing a marker position.

Since a marker position is fixed on a display screen in the "fix mode", adjustment is performed so that an object overlaps with a marker position by moving a head-mounted display while fixing the marker position. By pressing the determination button when the object overlaps with the marker position, the marker designates the object.

By releasing the mode switching button, a mode returns to the "normal mode".

Here, a mode is switched to the "fix mode" by pressing (keeping pressing) the mode switching button and switched to the "normal mode" by releasing the mode switching button. Practically however, the "fix mode" and the "normal mode" may be switched by pressing the mode switching button (each time the mode switching button is pressed).

[Third Correction Pattern: Marker Movement in Line Segment Direction]

As a third correction pattern, it can be considered to move a marker along an optical axis direction (a line segment direction) of the object pointing section 21.

For example, a mode is set to be changed from the object pointing mode (the "normal mode") to a "line segment moving mode" by a user pressing the mode switching button, and then minor adjustment is performed by moving the pointing device 20 (wand) to right and left while a user presses (keeps pressing) the mode switching button. After the marker position is adjusted, the position is determined with the determination button. By pressing the determination button when an object and a marker position overlap each other, the marker points the object.

By releasing the mode switching button, the mode returns to the "normal mode".

Here, a mode is switched to the "line segment moving mode" by pressing (keeping pressing) the mode switching button, and switched to the "normal mode" by releasing the mode switching button. Practically however, the "line segment moving mode" and the "normal mode" may be switched by pressing the mode switching button (each time the mode switching button is pressed).

[Feature of Present Embodiment]

In the present embodiment, the pointing device 20 (wand) further includes the user instruction inputting section 23, and the user instruction inputting section 23 can perform minor adjustment of calculated position information.

Consequently, a user can perform display control of additional information of a displayed object with precision, without losing extremely intuitive operation which is to point a target of interest.

<Third Embodiment>

The third embodiment of the present invention will be described below with reference to the drawings.

Figure 19:
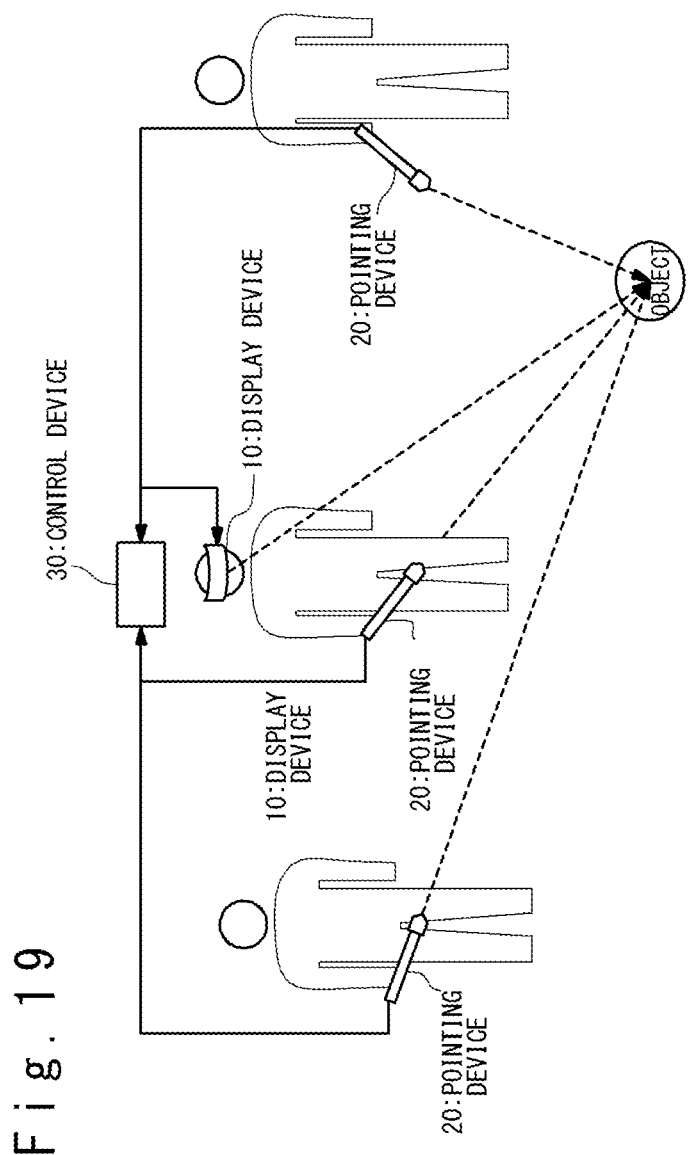
FIG. 19 is a view explaining a third embodiment of the present invention.

In the present embodiment, a plurality of wands is prepared as shown in FIG. 19.

A target object position calculating section 32 calculates position information of objects which are designated by the wands, based on output from pointed object identification information acquiring sections 22 of the wands. An additional information extracting section 33 extracts additional information related to objects which are designated by the wands from a storage section 34. An additional information output controlling section 35 presents additional information of objects which are designated by the wands to a display.

Consequently, it is possible to display additional information of objects which are designated not only by a wearer of a head-mounted display but also by a plurality of persons other than the wearer in a display of the wearer, thereby making it possible to promote communication.

For example, a plurality of persons can make a presentation (an explanation) to a specific person.

<Fourth Embodiment>

The fourth embodiment of the present invention will be described below with reference to the drawing.

Figure 20:
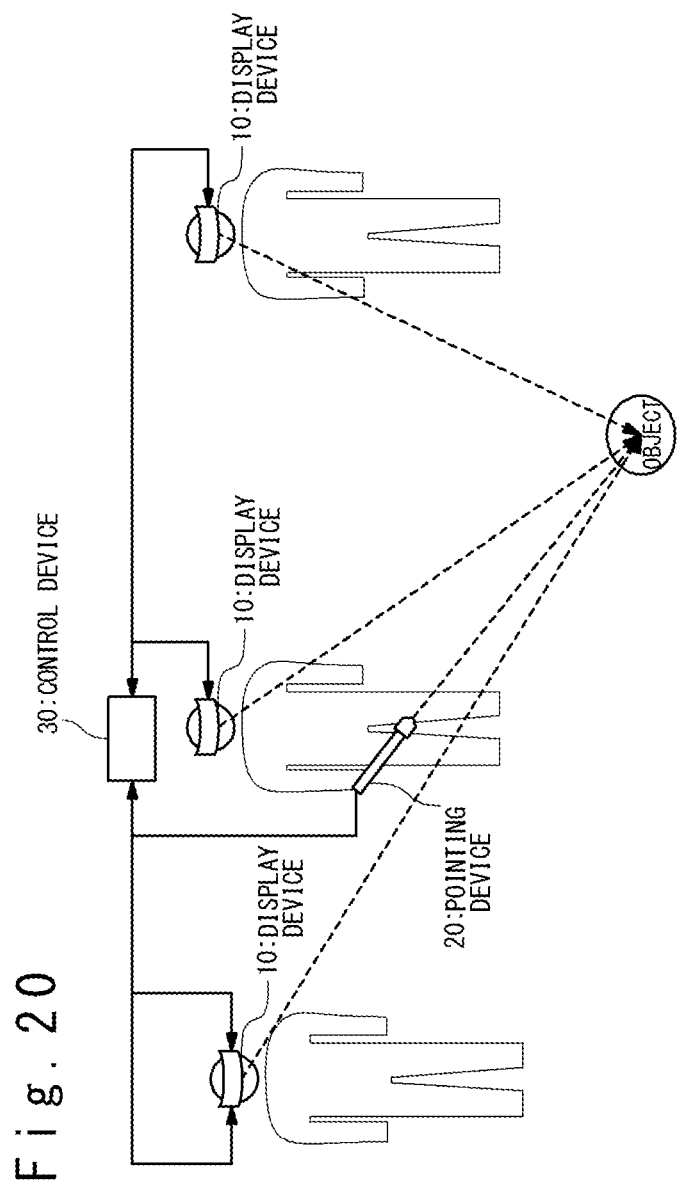
FIG. 20 is a view explaining a fourth embodiment of the present invention.

In the present embodiment, a plurality of displays is worn by separate persons, as shown in FIG. 20.

A target object position calculating section 32 calculates position information of an object designated by a single wand. An additional information extracting section 33 extracts additional information of the object from a storage section 34. An additional information output controlling section 35 presents the additional information of the object to the respective displays.

When calculating a position of the designated object, the target object position calculating section 32 absorbs the difference in displayed objects in the displays due to positions and postures of the users.

Consequently, additional information of an object pointed by one person can be displayed on displays worn by many persons.

For example, a guide (a tour guide) or a courier (a tour conductor) points a target object (e.g. a historical site) with a wand in a group tour, making it possible to display additional information of the target object to displays worn by many tourists.

Additionally, a lecturer points a target object (e.g. material) with a wand in a lecture and a seminar, making it possible to display additional information of the target object on displays worn by many participants.

This is especially effective when presentation by a specific person is delivered to a plurality of persons.

<Fifth Embodiment>

The fifth embodiment of the present invention will be described below with reference to the drawing.

In the present embodiment, where the third embodiment and the fourth embodiment are combined, a plurality of wands is prepared and a plurality of displays is worn by separate persons, as shown in FIG. 21.

In the case that angles of view of cameras of picture inputting sections 11 overlap each other, a target object position calculating section 32 calculates position information of objects which are pointed by the wands, based on output of pointed object identification information acquiring sections 22 extracted by the wands, in the overlapping area. An additional information extracting section 33 extracts additional information of the objects pointed by the wands from a storage section 34. An additional information output controlling section 35 presents the additional information of the objects pointed by the wands, to the displays.

Here, a case where all the wands point the same object is shown. Practically however, the respective wands may point different objects provided that the objects are within an area where angles of views of the cameras of the picture inputting sections 11 overlap each other.

<Sixth Embodiment>

The sixth embodiment of the present invention will be described below with reference to the drawing.

In the present embodiment, a virtual object is considered.

It is assumed that a storage section 34 stores an image and additional information of a virtual object in relation to display position information of the virtual object, or a specific object or a specific mark. An image of a virtual object may be a still image and a moving picture.

In the case that display position information of an virtual object is used, an object position calculating section 32 detects agreement between a position component and a direction component of a picture inputting section 11 provided to a display device 10 and a position component and a direction component of the display position information of the virtual object. A position which corresponds to the display position information of the virtual object is a target position. In this case, an additional information output controlling section 35 performs display control for displaying an image of the virtual object in a display area (display position or the neighborhood thereof) which corresponds to the display position information of the virtual object to an additional information outputting section 13.

When a specific object or a specific mark is used, a picture analyzing section 31 detects the presence of the specific object or the specific mark in a picture of the picture inputting section 11 of the display device 10. In this case, the additional information output controlling section 35 performs display control for displaying an image of the virtual object in a display area (located position or the neighborhood thereof) where the specific object or the specific mark is included to the additional information outputting section 13.

During display of the virtual object on the additional information outputting section 13 of the display device 10, the object position calculating section 32 recognizes a display position of the virtual object in the picture.

In the case that the "position information in the picture" calculated by the object position calculating section 32 agrees with a display position of the virtual object in the picture, the additional information output controlling section 35 performs display control for displaying additional information of the virtual object in the neighborhood of a display position of the virtual object. In the case that a plurality of virtual objects are displayed at this time, display control for displaying additional information of only an agreed virtual object in the neighborhood of a display position of the virtual object, is performed.

<Relationship Among Embodiments>

The above embodiments can be combined.

When a plurality of wands are used in the third embodiment and fifth embodiment, it can be considered to display an optical axis or a marker of each wand so that the optical axis and the marker can be recognized in order to judge which wand is used. For example, it can be considered to change display forms (e.g. a shape, a pattern, and a color) of the optical axis or the marker for each wand, and add identification information of each wand to the optical axis or the marker. Practically however, these examples are not the only choice.

In the fourth embodiment and the fifth embodiment, the single control device 30 is mentioned. Practically however, the control device 30 may be a plurality of electronic devices which can work together. For example, the control device 30 may be electronic devices provided to a plurality of head-mounted displays. These electronic devices have information in common and perform the same processing. The same information is displayed on each head-mounted display.

INDUSTRIAL APPLICABILITY

The present invention can be applied to an information display system which provides annotation of a real object in a semi-transmissive display.

The present invention can also be applied to use such as a display function in a presentation system and an education system by preparing a plurality of wands.

The description has been given here with a head-mounted display like a semi-transmissive display as an example. Practically however, a touch panel display such as a smartphone can be used instead of a head-mounted display. It is not necessarily for a display to be worn by a person.

CONCLUSION

With the information display system of the present invention as described above, when displaying accompanying information related to an object, it is possible to intuitively select and control an object with which accompanying information should be displayed.

The following problems (1) to (3) conventionally occur when additional information is displayed on a wearable display (mostly a transmissive type) like a head-mounted display and a large-screen display.

(1) First Problem

Since space of various types of displays including a head-mounted display is limited, it is difficult to display a large amount of information within the space. Therefore, when there are a plurality of objects to which additional information is provided and all the additional information is displayed on a screen, an extremely large amount of information is displayed, thereby causing problems such as "a screen be comes complicated", "important information is hidden", "looking at a real object in a transmissive type becomes difficult" and "only brief information can be displayed".

(2) Second Problem

Since a head-mounted display is set close to the eyes of a user in the case that the head-mounted display is used, a display cannot directly be touched when position information of an object on the display is to be designated with a hand/finger and so on. The act of directly touching a display is not intuitive for a user, causing a problem that an act of inputting itself is difficult. Therefore, in relation to the first problem, it is not possible to intuitively perform inputting when a large amount of information is selectively displayed.

(3) Third Problem

Since a size of a display such as ahead-mounted display and display-type sunglasses is small, it is difficult to accurately designate a spot with a hand/finger and so on. Additionally, since a target object such as a living thing and a mobile object moves in three dimensions (in a stereoscopic way), it is difficult to deal with the target object by using a two-dimensional input device such as a mouse, and continuation of tracking while a user is moving is especially difficult when a target object such as a living thing and a mobile object are pursued. Therefore, inputting with high precision is difficult when at least either the target object or the user is moving, e.g. when the target object is moving or when the user changes posture.

The present invention provides an information display system for intuitively selecting a target object when additional information is provided to a picture shot on real space. In particular, there is provided an information display system for intuitively selecting a display target when only additional information is displayed for a real object at the back of a display by using a transmissive display.

The information display system according to the present invention includes a picture inputting section, a storage section, a picture analyzing section, an additional information extracting section, an additional information outputting section, an object pointing section, a pointed object identification information acquiring section, a target object position calculating section, and an additional information output controlling section.

The picture inputting section acquires a picture of real space. The storage section stores additional information related to an object in real space (a real object). The picture analyzing section extracts an object from a picture acquired by the picture inputting section. The additional information extracting section extracts additional information related to the extracted object from the storage section. The additional information outputting section displays the extracted additional information. The object pointing section points an object in real space. The pointed object identification information acquiring section outputs information which shows a position or visual feature for identifying an object pointed by the object pointing section. The target object position calculating section calculates a position (coordinate values) on a display of the object in real space pointed by the object pointing section based on information outputted from the pointed object identification information acquiring section, and outputs position information in the acquired picture of the pointed object. The additional information output controlling section performs display control for displaying additional information on the additional information outputting section, based on the position information calculated by the target object position calculating section.

The present invention can solve the conventional problems by employing the above system configuration and performing display control of additional information based on calculated position information.

In the present invention for example, presence or non-presence of displaying can be controlled by receiving input from the object pointing section, making it possible to display additional information in accordance with a state of a target object.

Additionally, since an act of pointing a target object by using direction pointing is extremely intuitive operation for a user, a user can intuitively perform information inputting for additional information display.

Since looking at a target object in three dimensions (in a stereoscopic way) is easy in accordance with user's experience, designation with high precision is possible.

<Supplementary Note>

The whole or part of the exemplary embodiments disclosed above can be described as, but not limited to, the following supplementary notes.

(Supplementary Note 1)

An information display system including:

a picture inputting section configured to acquire a picture of real space, a storage section configured to store additional information related to an object in real space;

a picture analyzing section configured to extract an object from a picture acquired by the picture inputting section;

an additional information extracting section configured to extract additional information related to an extracted object from the storage section;

an additional information outputting section configured to display extracted additional information;

an object pointing section setting at the tip of a wand, configured to, for a user, point an object in real space;

a pointed object identification information acquiring section configured to output information which shows a feature (a position or a visual feature) for identifying an object pointed by the object pointing section;

a target object position calculating section configured to output position information in an acquired picture of a pointed object based on information outputted from the pointed object identification information acquiring section; and an additional information output controlling section configured to perform display control of additional information displayed on the additional information outputting section based on position information calculated by the target object position calculating section.

(Supplementary Note 2)

The information display system of Supplementary note 1, wherein the pointed object identification information acquiring section outputs a picture of a pointed direction, and the target object position calculating section checks an acquired picture with a visual feature of the center of a picture in a pointed direction, and calculates position information in an acquired picture of a pointed object.

(Supplementary Note 3)

The information display system of Supplementary note 1, further includes a picture-shot object identification information acquiring section configured to acquire information on a position component and a direction component of the picture inputting section, wherein the target object position calculating section checks information on a position component and a direction component of the picture inputting section with information on a position component and a direction component of the object pointing section, and calculates position information in an acquired picture of a pointed object.

(Supplementary Note 4)

The information display system of any one of Supplementary notes 1 to 3, wherein the additional information output controlling section displays only additional information of a pointed object.

(Supplementary Note 5)

The information display system of any one of Supplementary notes 1 to 4, further including:

an additional state storage section configured to store a display state of additional information; and a user instruction inputting section configured to perform user's pointing inputting, wherein the additional information output controlling section controls displaying/non-displaying of additional information of a pointed object, based on pointing from the user instruction inputting section.

(Supplementary Note 6)

The information display system of any one of Supplementary notes 1 to 5, wherein the additional information output controlling section performs superimposed display of a marker for user confirmation on a position calculated by the target object position calculating section.

(Supplementary Note 7)

The information display system of any one of Supplementary notes 1 to 6, wherein the additional information output controlling section performs superimposed display of a pseudo light beam pointed by the object pointing section.

(Supplementary Note 8)

The information display system of any one of Supplementary notes 1 to 7, further including:

a plurality of object pointing sections corresponding to the object pointing section; and a plurality of pointed object identification information acquiring sections corresponding to the pointed object identification information acquiring section, wherein the additional information output controlling section controls display of additional information of a corresponding object, based on output of the plurality of pointed object identification information acquiring sections.

(Supplementary Note 9)

The information display system of any one of Supplementary notes 1 to 8, further including:

a plurality of picture inputting sections corresponding to the picture inputting section; and a plurality of additional information outputting sections corresponding to the additional information outputting section, wherein the additional information output controlling section calculates a position of a pointed object in pictures acquired by the plurality of picture inputting sections, and displays additional information on the additional information outputting sections.

(Supplementary Note 10)

The information display system of any one of Supplementary notes 1 to 9, further including a position adjusting section configured to adjust a calculated position of an object through user's inputting.

(Supplementary Note 11)

The information display system of Supplementary note 10, wherein the position adjusting section performs adjustment of acquired position information in an up-down direction.

(Supplementary Note 12)

The information display system of Supplementary note 10, wherein the position adjusting section fixes a position in a picture and operates a picture inputted by the picture inputting section, thereby displaying a target object at a fixed position so that the target object is determined.

(Supplementary Note 13)

The information display system of Supplementary note 10, wherein the position adjusting section changes a depth value through user's inputting while displaying an optical axis line segment of the object pointing section in a picture, from information on a position component and a direction component of a camera, and position information and direction information of the object pointing section.

<Remark>

Although the exemplary embodiments of the present invention have been described above in detail, the present invention is not limited to the above-mentioned exemplary embodiments and changes or modifications without departing from the scope of the invention are also included in the present invention.

The present application claims priority which is based on Japanese Patent Application No. 2011-193953, the disclosure of which is incorporated in the present application by reference.

The invention claimed is:

1. An information display system comprising:
   at least one display device;
   at least one pointing device; and
   a control device configured to communicate with said at least one display device and said at least one pointing device,
   wherein said control device identifies an object which can be seen through said at least one display device based on information not from said at least one display device but from said at least one pointing device which points said object in a real space, and performs display control of additional information with respect to said object to on said at least one display device, and
   said control device checks a visual feature of a picture from said at least one display device with a visual feature at a center of a picture from said at least one pointing device and calculates position information in a picture from said at least one display device with respect to an object which is pointed by said at least one pointing device.

2. An information display system comprising:
   at least one display device;
   at least one pointing device; and
   a control device configured to communicate with said at least one display device and said at least one pointing device,
   wherein said control device identifies an object which can be seen through said at least one display device based on information not from said at least one display device but from said at least one pointing device which points said object in a real space, and performs display control of additional information with respect to said object to on said at least one display device, and
   said control device checks information related to a position component and a direction component of said at least one display device with information related to a position component and a direction component of said at least one pointing device and calculates position information in a picture from said at least one display device with respect to an object which is pointed by said at least one pointing device.

3. An information display system comprising:
   at least one display device;
   at least one pointing device; and
   a control device configured to communicate with said at least one display device and said at least one pointing device,
   wherein said control device identifies an object which can be seen through said at least one display device based on information not from said at least one display device but from said at least one pointing device which points said object in a real space, and performs display control of additional information with respect to said object to on said at least one display device,
   said control device performs display control of an optical axis showing a line segment of a direction which is pointed by said at least one pointing device based on information related to a position component and a direction component of said at least one pointing device, and
   said control device changes a depth value of an optical axis showing a line segment of a direction which is pointed by said at least one pointing device in accordance with input pointing from said at least one pointing device based on information related to a position component and a direction component of said at least one display device and information related to a position component and a direction component of said at least one pointing device.

4. An information display system comprising:
   at least one display device;
   at least one pointing device; and
   a control device configured to communicate with said at least one display device and said at least one pointing device,
   wherein said control device identifies an object which can be seen through said at least one display device based on information not from said at least one display device but from said at least one pointing device which points said object in a real space, and performs display control of additional information with respect to said object to on said at least one display device, and
   said control device performs, when a position of a marker displayed in said at least one display device is adjusted from said at least one pointing device, in a case that said adjusted position of a marker overlaps with a position of said object in a picture from said at least one display device, display control of additional information related to said object.

5. The information display system according to claim 4, wherein said control device performs adjustment such that a position of a marker overlaps with said pointed object by moving a marker in up and down directions and right and left directions based on input pointing from said at least one pointing device.

6. The information display system according to claim 4, wherein said control device performs adjustment, while fixing a position of a marker, such that said pointed object overlaps with said fixed position of a marker.

7. The information display system according to claim 4, wherein said control device performs adjustment such that a position of a marker overlaps with said pointed object by moving a marker along a line segment direction of an optical axis showing a line segment of a direction which is pointed by said at least one pointing device.

8. An information display system comprising:
   at least one display device;
   at least one pointing device; and
   a control device configured to communicate with said at least one display device and said at least one pointing device,
   wherein said control device identifies an object which can be seen through said at least one display device based on information not from said at least one display device but from said at least one pointing device which points said object in a real space, and performs display control of additional information with respect to said object to on said at least one display device,
   and said control device relates an image and additional information of a virtual object to display position information of a virtual object to store them, detects that a position component and a direction component of said at least one display device is coincide with a position component and a direction component of display position information of a virtual object, and performs display control on said at least one display device for displaying an image of a virtual object in a display region corresponding to a display position information of a virtual object.

9. The information display system according to claim 8, wherein said control device recognizes, when making said at least one display device display a virtual object, a display position of a virtual object in the picture, and in a case that calculated position information in a picture is coincide with a display position of a virtual object in a picture, said control device performs display control for displaying additional information of a virtual object near a display position of said virtual object.

10. An information display system comprising:
at least one display device;
at least one pointing device; and
a control device configured to communicate with said at least one display device and said at least one pointing device,
wherein said control device identifies an object which can be seen through said at least one display device based on information not from said at least one display device but from said at least one pointing device which points said object in a real space, and performs display control of additional information with respect to said object to on said at least one display device,
and said control device relates an image and additional information of a virtual object to a specific object or a specific mark to store them, detects that a specific object or a specific mark exists in a picture from said at least one display device, and performs display control on said at least one display device for displaying an image of a virtual object in a display region including a specific object or a specific mark.

11. The information display system according to claim 10, wherein said control device recognizes, when making said at least one display device display a virtual object, a display position of a virtual object in the picture, and in a case that calculated position information in a picture is coincide with a display position of a virtual object in a picture, said control device performs display control for displaying additional information of a virtual object near a display position of said virtual object.

12. An information display system comprising:
at least one display device;
at least one pointing device; and
a control device configured to communicate with said at least one display device and said at least one pointing device,
wherein said control device identifies an object which can be seen through said at least one display device based on information not from said at least one display device but from said at least one pointing device which points said object in a real space, and performs display control of additional information with respect to said object to on said at least one display device;
wherein said at least one display device includes:
a picture inputting section configured to acquire a picture including an object in real space, and
an additional information outputting section configured to display additional information related to said object in real space,
wherein said at least one pointing device includes:
an object pointing section configured to be used by a user to point said object in real space and
pointed object identification information acquiring section configured to output information showing a feature for identifying an object pointed by said object pointing section,
wherein said control device includes:
a picture analyzing section configured to identify, by analyzing a picture acquired from said picture inputting section, an object in said acquired picture,
a target object position calculating section configured to output position information in said acquired picture for said pointed object and output position information in said acquired picture for said pointed object based on information outputted from said pointed object identification information acquiring section,
a storage section configured to store additional information related to said object in real space,
an additional information extracting section configured to extract at least one of additional information related to said identified object and additional information related to said pointed object, from said storage section, and
an additional information output controlling section configured to perform display control of additional information extracted by said additional information extracting section based on position information calculated by said target object position calculating section.

* * * * *